(12) United States Patent
Yamamoto et al.

(10) Patent No.: US 11,635,996 B2
(45) Date of Patent: Apr. 25, 2023

(54) MANAGEMENT SYSTEM AND MANAGEMENT METHOD FOR MIGRATING A BUSINESS SYSTEM OPERATING ON A TARGET INFRASTRUCTURE

(71) Applicant: Hitachi, Ltd., Tokyo (JP)

(72) Inventors: Satoshi Yamamoto, Tokyo (JP); Yuta Nishihara, Tokyo (JP); Taihei Hashimoto, Tokyo (JP); Naru Kato, Tokyo (JP)

(73) Assignee: HITACHI, LTD., Tokyo (JP)

( * ) Notice: Subject to any disclaimer, the term of this patent is extended or adjusted under 35 U.S.C. 154(b) by 282 days.

(21) Appl. No.: 17/002,988

(22) Filed: Aug. 26, 2020

(65) Prior Publication Data

US 2021/0278986 A1 Sep. 9, 2021

(30) Foreign Application Priority Data

Mar. 4, 2020 (JP) .............................. JP2020-036806

(51) Int. Cl.
*G06F 9/46* (2006.01)
*G06F 9/50* (2006.01)
*G06F 9/455* (2018.01)

(52) U.S. Cl.
CPC ........ *G06F 9/5083* (2013.01); *G06F 9/45558* (2013.01); *G06F 2009/4557* (2013.01); *G06F 2009/45583* (2013.01); *G06F 2009/45591* (2013.01); *G06F 2209/503* (2013.01); *G06F 2209/506* (2013.01); *G06F 2209/508* (2013.01)

(58) Field of Classification Search
CPC ............... G06F 9/5083; G06F 9/45558; G06F 2009/4557; G06F 2009/45583; G06F 2009/45591; G06F 2209/503; G06F 2209/506; G06F 2209/508
USPC .............................................................. 718/1
See application file for complete search history.

(56) References Cited

U.S. PATENT DOCUMENTS 10,484,301 B1 * 11/2019 Shukla .................. H04L 47/823
2012/0089548 A1 * 4/2012 Kobayashi ............ G06F 3/0605
706/46

(Continued)

FOREIGN PATENT DOCUMENTS

JP 2016-511877 A 4/2016

*Primary Examiner* — Bradley A Teets
(74) *Attorney, Agent, or Firm* — Mattingly & Malur, PC

(57) ABSTRACT

A management system manages an infrastructure system configured to provide a resource for operating a business system and included a plurality of infrastructures with different architecture. The management system comprises a monitoring module configured to monitor a usage state of the resource of the business system; and an analysis module configured to identify a business system being a migration target. The analysis module is configured to: analyze a usage tendency of the resource of the business system, determine which of the infrastructures is appropriate for the business system, and store a result of determining as a first determination result; identify a target infrastructure, which is an infrastructure for which the resource is predicted to become insufficient; select a business system being the migration target from among business systems operating on the target infrastructure based on the first determination result; and migrate the selected business system.

12 Claims, 22 Drawing Sheets

(56) References Cited

U.S. PATENT DOCUMENTS

| | | | | |
|---|---|---|---|---|
| 2013/0346973 A1* | 12/2013 | Oda | ................... | G06F 9/5088 |
| | | | | 718/1 |
| 2015/0236977 A1* | 8/2015 | Terayama | ............. | H04L 47/762 |
| | | | | 709/224 |
| 2015/0373103 A1* | 12/2015 | Tessier | .................... | H04L 43/04 |
| | | | | 709/203 |
| 2018/0136958 A1* | 5/2018 | Nagpal | ............... | G06F 9/45558 |
| 2020/0142732 A1* | 5/2020 | Okuno | .................. | G06F 9/4856 |

\* cited by examiner

FIG. 3

| STORAGE ID 301 | POOL ID 302 | CAPACITY 303 | CAPACITY THRESHOLD VALUE 304 | MP THRESHOLD VALUE 305 | VOLUME TYPE 306 | VOLUME COST [¥/GB] 307 | MP COST [¥/STORAGE] 308 | FUNCTION 309 | | |
|---|---|---|---|---|---|---|---|---|---|---|
| | | | | | | | | COPY 311 | OPTIMIZATION 312 | COMPRESSION/ DEDUPLICATION 313 |
| Str_1 | Pool_1 | 10,000 | 80 | 90 | SSD | 0.3 | 1,000 | - | - | - |
| Str_1 | Pool_2 | 20,000 | 80 | 90 | HDD | 0.05 | 1,000 | 3 | - | VALID |
| Str_2 | Pool_1 | 20,000 | 80 | 90 | HDD/SSD | 0.15 | 1,000 | 2 | VALID | - |

| CLUSTER ID 501 | CAPACITY 502 | CAPACITY THRESHOLD VALUE 503 | VOLUME TYPE 504 | VOLUME COST [¥/GB] 505 | FUNCTION 506 ||| 
|---|---|---|---|---|---|---|---|
| | | | | | COPY 511 | OPTIMIZATION 512 | COMPRESSION/ DEDUPLICATION 513 |
| CL_1 | 1,000 | 80 | SSD | 0.5 | - | - | - |
| CL_2 | 2,000 | 80 | HDD | 0.1 | 3 | - | VALID |

222

| | 601 | 602 | 603 | 604 | 223 |
|---|---|---|---|---|---|
| | SERVER ID | CLUSTER ID | CPU THRESHOLD VALUE | CPU COST [¥/SERVER] | |
| | S_1-1 | Cl_1 | 0.8 | 500 | |
| | S_1-2 | Cl_1 | 0.8 | 500 | |
| | S_1-3 | Cl_1 | 0.8 | 500 | |
| | S_2-1 | Cl_2 | 0.7 | 500 | |
| | S_2-2 | Cl_2 | 0.7 | 500 | |
| | S_2-3 | Cl_2 | 0.7 | 500 | |

FIG. 6

| 701 | 702 | 703 | 224 |
|---|---|---|---|
| DATE AND TIME | SERVER ID | CPU USAGE RATE | |
| 2019/8/27 10:00 | S_1 | 10 | |
| 2019/8/27 10:00 | S_2 | 5 | |
| 2019/8/27 10:00 | S_3 | 5 | |
| 2019/8/27 10:01 | S_1 | 10 | |
| 2019/8/27 10:01 | S_2 | 5 | |
| 2019/8/27 10:01 | S_3 | 5 | |

FIG. 7

| 801 | 802 | 803 | 804 | 805 | 225 |
|---|---|---|---|---|---|
| DATE AND TIME | STORAGE ID | POOL ID | USAGE AMOUNT | MP USAGE RATE | |
| 2019/8/27 10:00 | Str_1 | Pool_1 | 1,000 | 5 | |
| 2019/8/27 10:00 | Str_1 | Pool_2 | 2,000 | 2 | |
| 2019/8/27 10:01 | Str_2 | Pool_1 | 1,000 | 5 | |
| 2019/8/27 10:01 | Str_2 | Pool_2 | 2,000 | 2 | |

FIG. 8

| 1001 | 1002 | 1003 | 227 |
|---|---|---|---|

| DATE AND TIME | SERVER ID | CPU USAGE RATE |
|---|---|---|
| 2019/8/27 10:00 | S_1-1 | 10 |
| 2019/8/27 10:00 | S_1-2 | 5 |
| 2019/8/27 10:00 | S_1-3 | 5 |
| 2019/8/27 10:00 | S_2-1 | 20 |
| 2019/8/27 10:00 | S_2-2 | 30 |
| 2019/8/27 10:00 | S_2-3 | 20 |
| 2019/8/27 10:01 | S_1-1 | 10 |
| 2019/8/27 10:01 | S_1-2 | 5 |
| 2019/8/27 10:01 | S_1-3 | 5 |
| 2019/8/27 10:01 | S_2-1 | 20 |
| 2019/8/27 10:01 | S_2-2 | 30 |
| 2019/8/27 10:01 | S_2-3 | 20 |

FIG. 10

| DATE AND TIME | CLUSTER ID | USAGE AMOUNT |
|---|---|---|
| 2019/8/27 10:00 | Cl_1 | 100 |
| 2019/8/27 10:00 | Cl_2 | 1,000 |
| 2019/8/27 10:01 | Cl_1 | 100 |
| 2019/8/27 10:01 | Cl_2 | 1,000 |

FIG. 11

| DATE AND TIME | VOLUME ID | SERVER ID | CLUSTER ID | USAGE AMOUNT | REDUCTION RATE | CPU USAGE RATE | CPU USAGE RATE (FUNCTION) |
|---|---|---|---|---|---|---|---|
| 2019/8/27 10:00 | Vol_1 | S_1-1 | Cl_1 | 10 | 20 | 5 | 1 |
| 2019/8/27 10:00 | Vol_2 | S_1-1 | Cl_1 | 30 | 15 | 3 | 2 |
| 2019/8/27 10:00 | Vol_3 | S_1-1 | Cl_1 | 60 | 5 | 2 | 1 |
| 2019/8/27 10:01 | Vol_1 | S_1-1 | Cl_1 | 10 | 21 | 5 | 1 |
| 2019/8/27 10:01 | Vol_2 | S_1-1 | Cl_1 | 30 | 14 | 3 | 2 |
| 2019/8/27 10:01 | Vol_3 | S_1-1 | Cl_1 | 60 | 6 | 2 | 1 |

FIG. 12

VOLUME EVALUATION INFORMATION 230

1300

| VOLUME ID | FIRST INFRASTRUCTURE EVALUATION VALUE | SECOND INFRASTRUCTURE EVALUATION VALUE |
|---|---|---|
| Vol_1 | 6.2 | 0.5 |
| Vol_2 | 1.1 | 0.2 |
| Vol_3 | 0.3 | 0.7 |
| Vol_4 | 0.2 | 0.7 |
| Vol_5 | 5.5 | 0.1 |

1310

| VOLUME ID | FIRST INFRASTRUCTURE EVALUATION VALUE | SECOND INFRASTRUCTURE EVALUATION VALUE |
|---|---|---|
| Vol_1 | 1.3 | 0.2 |
| Vol_2 | 1.5 | 0.1 |
| Vol_3 | 0.5 | 0.6 |

*FIG. 13*

THRESHOLD VALUE INFORMATION 231

1400

| STORAGE ID | MIGRATION THRESHOLD VALUE |
|---|---|
| Str-1 | 50 |

1410

| CLUSTER ID | MIGRATION THRESHOLD VALUE |
|---|---|
| Cl-1 | 60 |
| Cl-2 | 55 |

*FIG. 14*

MIGRATION REQUIREMENT DETERMINATION INFORMATION — 232, 1500

| STORAGE ID (1501) | POOL ID (1502) | DETERMINATION RESULT (1503) |
|---|---|---|
| Str_1 | Pool_1 | REQUIRED |
| Str_1 | Pool_2 | NOT REQUIRED |

1510

| SERVER ID (1511) | DETERMINATION RESULT (1512) |
|---|---|
| S_1-1 | REQUIRED |
| S_1-2 | NOT REQUIRED |
| S_1-3 | NOT REQUIRED |
| S_2-1 | REQUIRED |
| S_2-2 | REQUIRED |
| S_2-3 | NOT REQUIRED |

*FIG. 15*

PATTERN EVALUATION INFORMATION 233, 1600

| PATTERN ID 1601 | PATTERN 1602 | | | FEASIBILITY 1603 | COST 1604 |
|---|---|---|---|---|---|
| | Vol_1 | Vol4 | Vol3 | | |
| Pa_1 | Str_1,Pool_1 | Str_1,Pool_1 | Str_1,Pool_1 | FEASIBLE | ¥1,000 |
| Pa_2 | Str_1,Pool_2 | Str_1,Pool_2 | Str_1,Pool_1 | NOT FEASIBLE | - |
| Pa_3 | Str_1,Pool_1 | Str_1,Pool_1 | Str_1,Pool_2 | FEASIBLE | ¥1,500 |

1610

| PATTERN ID 1611 | PATTERN 1612 | | | FEASIBILITY 1613 | COST 1614 |
|---|---|---|---|---|---|
| | Vol1 | Vol_5 | Vol3 | | |
| Pa_1 | Cl_1,S_1-1 | Cl_1,S_1-1 | Cl_1,S_1-1 | FEASIBLE | ¥1,500 |
| Pa_2 | Cl_1,S_1-2 | Cl_1,S_1-1 | Cl_1,S_1-1 | NOT FEASIBLE | - |
| Pa_3 | Cl_1,S_1-1 | Cl_1,S_1-2 | Cl_1,S_1-1 | FEASIBLE | ¥1,000 |

*FIG. 16*

MANAGEMENT SYSTEM AND MANAGEMENT METHOD FOR MIGRATING A BUSINESS SYSTEM OPERATING ON A TARGET INFRASTRUCTURE

CLAIM OF PRIORITY

The present application claims priority from Japanese patent application JP 2020-36806 filed on Mar. 4, 2020, the content of which is hereby incorporated by reference into this application.

BACKGROUND OF THE INVENTION

This invention relates to a technology of migrating a business system between infrastructures.

There is known a three-tier infrastructure and a hyper-converged infrastructure (HCI) as an infrastructure for providing resources for operating a business system. The three-tier infrastructure includes a server, a SAN switch, and a storage system. The HCI includes a general-purpose server, and uses a software defined storage (SDS) technology to implement a three-tier function, namely, a server, a SAN switch, and a storage system.

The three-tier infrastructure and the HCI have different architecture characteristics (computer resource characteristic and storage resource characteristic). For example, the three-tier infrastructure is required to use dedicated hardware, whereas the HCI is not required to use dedicated hardware. The three-tier infrastructure can individually add or reduce resources of respective layers, and thus can flexibly change the computer resource and the storage resource. The HCI is required to add resources in units of server, and thus cannot change only the resources of a specific layer. In other words, the HCI cannot flexibly change the computer resource and the storage resource.

There are known technologies of JP 2016-511877 A and US 2018/0136958 A1 as a technology of migrating a business system constructed by, for example, a virtual machine and a virtual volume using a three-tier infrastructure or an HCI.

In JP 2016-511877 A, there is described "A system, comprising: a processor; and a non-transitory computer-readable medium, comprising instructions that, when executed by the processor, direct the processor to: receive data related to characteristics of a computing resource; compare the data received to predetermined dimensions related to the transferability of the computing resource to a cloud computing environment to determine a comparison value indicating how close the data is to each dimension; and generate a report based on the comparison."

In US 2018/0136958 A1, it is described that "A system for placing virtual machines in a virtualization environment receives instructions to place a virtual machine within the virtualization environment, wherein the virtual environment includes a plurality of host machines that include a hypervisor, at least one user virtual machine, and an input/output (I/O) controller and a virtual disk that includes a plurality of storage devices and is accessible by all of the I/O controllers, wherein the I/O controllers conduct I/O transactions with the virtual disk based on I/O requests received from the UVMs. The system determines a predicted resource usage profile for the virtual machine. The system selects, based on the predicted resource usage profile, one of the host machines for placement of the virtual machine. The system places the virtual machine on the selected one of the host machines."

SUMMARY OF THE INVENTION

In the related-art migration technology, a system including only the three-tier infrastructure or a system including only the HCI is assumed, and a migration technology is not provided for a system including a three-tier infrastructure and an HCI in a mixed manner.

This invention provides a system and method for implementing a migration technology for optimizing arrangement of a business system in a system including a three-tier infrastructure and an HCI in a mixed manner.

A representative example of the present invention disclosed in this specification is as follows: a management system is configured to manage an infrastructure system. The infrastructure system is configured to provide a resource for operating a business system and includes a plurality of infrastructures with different architecture. The management system comprises at least one computer including a processor, a storage device coupled to the processor, and a network interface coupled to the processor. The plurality of infrastructures includes a first infrastructure, which is constructed by at least one server apparatus, at least one switch, and at least one storage system, and a second infrastructure, which is constructed by at least one server apparatus. The management system further comprises a monitoring module configured to monitor a usage state of the resource of the business system operating on each of the plurality of infrastructures, and an analysis module configured to identify a business system being a migration target based on the usage state of the resource of each of a plurality of business systems. The analysis module is configured to: analyze a usage tendency of the resource of the business system based on the usage state of the resource of the business system; determine which of the first infrastructure and the second infrastructure is appropriate for the business system based on a result of analyzing the usage tendency of the resource of the business system, and store a result of determining as a first determination result; identify a target infrastructure, which is an infrastructure for which the resource is predicted to become insufficient, among the plurality of infrastructures, based on the usage state of the resource of the each of the plurality of business systems, and store the target infrastructure as a second determination result; select at least one business system being the migration target from among a plurality of business systems operating on the target infrastructure based on the first determination result and the second determination result; and migrate the at least one selected business system.

According to at least one embodiment of this invention, it is possible to achieve the migration technology for optimizing arrangement of the business system in the system including the three-tier infrastructure and the HCI in a mixed manner. Other problems, configurations, and effects than those described above will become apparent in the descriptions of embodiments below.

BRIEF DESCRIPTION OF THE DRAWINGS

The present invention can be appreciated by the description which follows in conjunction with the following figures, wherein:

FIG. 3 is a table for showing an example of the data structure of three-tier configuration information in the first embodiment;

FIG. 5 is a table for showing an example of the data structure of HCI configuration information in the first embodiment;

FIG. 6 is a table for showing an example of the data structure of HCI server information in the first embodiment;

FIG. 7 is a table for showing an example of the data structure of three-tier server monitoring information in the first embodiment;

FIG. 8 is a table for showing an example of the data structure of three-tier pool monitoring information in the first embodiment;

FIG. 10 is a table for showing an example of the data structure of HCI server monitoring information in the first embodiment;

FIG. 11 is a table for showing an example of the data structure of HCI pool monitoring information in the first embodiment;

FIG. 12 is a table for showing an example of the data structure of HCI volume monitoring information in the first embodiment;

FIG. 13 is a table for showing an example of the data structure of volume evaluation information in the first embodiment;

FIG. 14 is a table for showing an example of the data structure of threshold value information in the first embodiment;

FIG. 15 is a table for showing an example of the data structure of migration requirement determination information in the first embodiment;

FIG. 16 is a table for showing an example of the data structure of pattern evaluation information in the first embodiment;

DETAILED DESCRIPTION OF THE PREFERRED EMBODIMENTS

Figure 1:
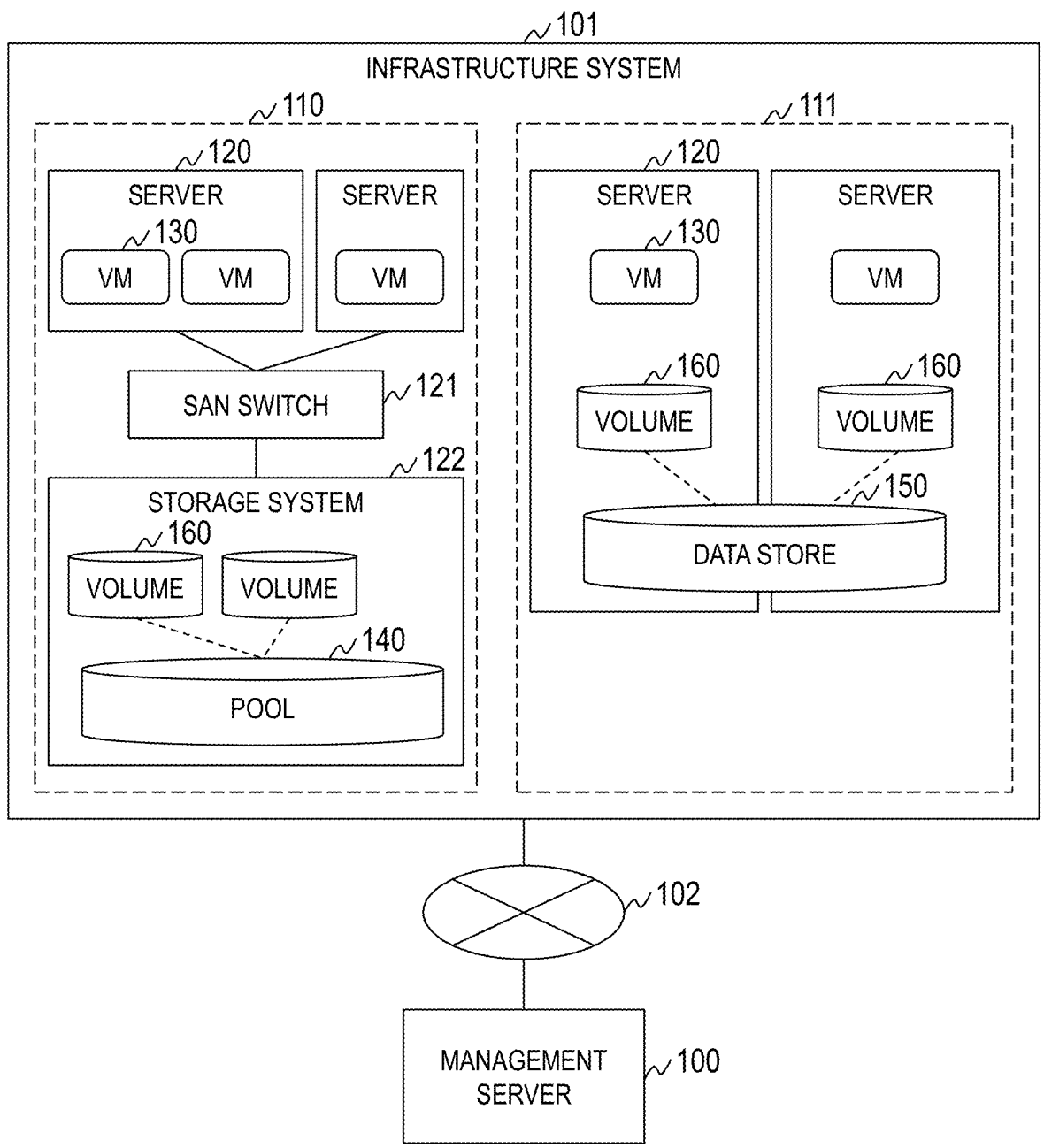
FIG. 1 is a diagram for illustrating an example of a configuration of a computer system in a first embodiment of this invention.

Now, a description is given of an embodiment of this invention referring to the drawings. It should be noted that this invention is not to be construed by limiting the invention to the content described in the following embodiment. A person skilled in the art would easily recognize that a specific configuration described in the following embodiment may be changed within the scope of the concept and the gist of this invention. In a configuration of this invention described below, the same or similar components or functions are assigned with the same reference numerals, and a redundant description thereof is omitted here. Notations of, for example, "first", "second", and "third" herein are assigned to distinguish between components, and do not necessarily limit the number or order of those components.

First Embodiment

Figure 2:
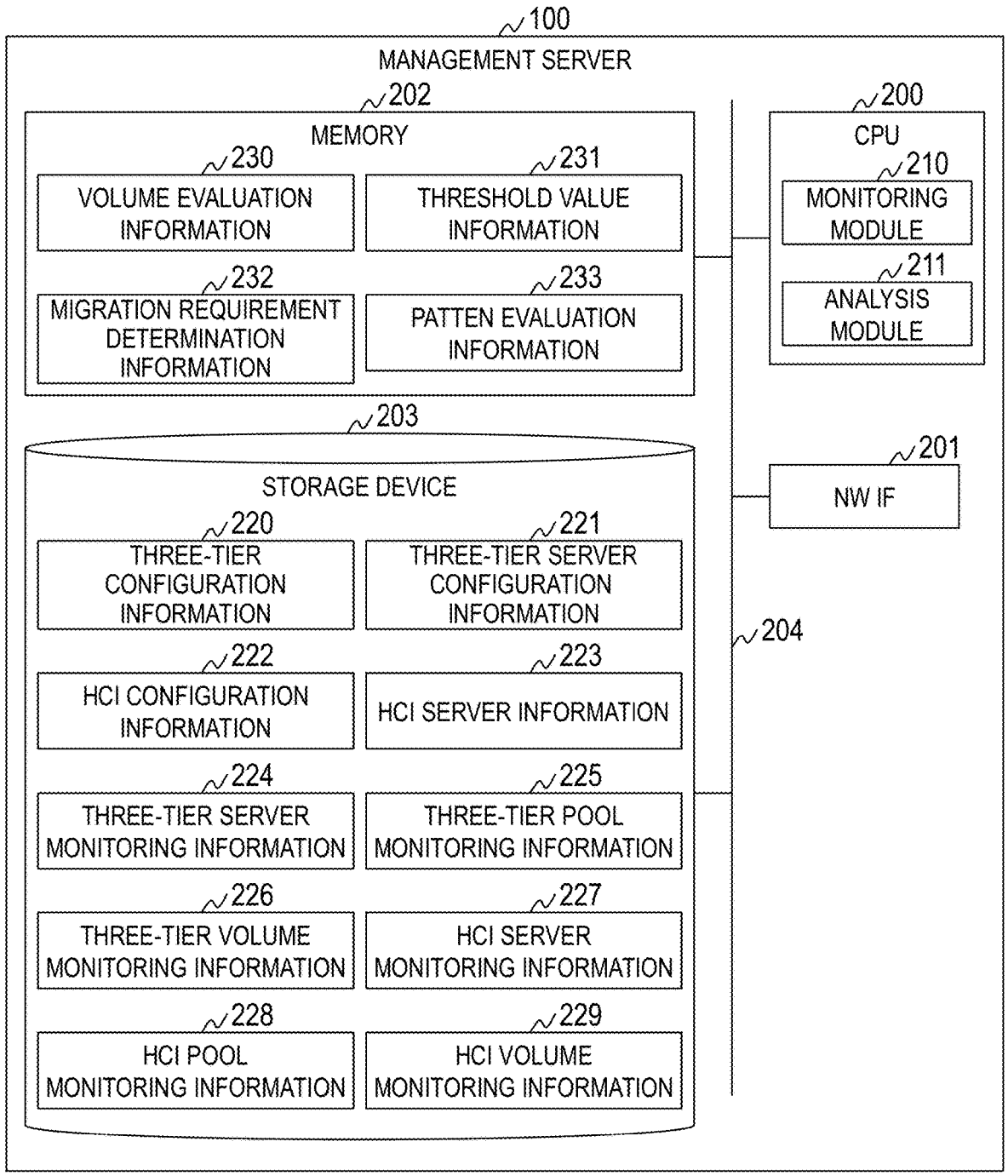
FIG. 2 is a diagram for illustrating an example of a configuration of a management server in the first embodiment.

FIG. 1 is a diagram for illustrating an example of a configuration of a computer system in a first embodiment of this invention. FIG. 2 is a diagram for illustrating an example of a configuration of a management server in the first embodiment.

The computer system includes a management server 100 and an infrastructure system 101. The management server 100 and the infrastructure system 101 are coupled to each other via a network 102. The network 102 is, for example, a wide area network (WAN) or a local area network (LAN). The network 102 may be any one of a wired network and a wireless network.

The infrastructure system 101 is a system configured to provide resources for constructing a business system configured to execute a predetermined service. The resources to be provided can be divided into a resource (calculation resource) for calculation and a resource (storage resource) for storing data. When the calculation resource and the storage resource are not distinguished from each other, those two resources are simply referred to as "resource".

The business system includes at least one virtual machine 130 and at least one virtual volume 160. There may be any number of virtual machines 130 and any number of virtual volumes 160 included in the business system. Further, the business system may include components other than a virtual machine 130 and a virtual volume 160.

In the following description, the virtual machine 130 is referred to as "VM 130", and the virtual volume 160 is referred to as "volume 160".

The infrastructure system 101 includes at least one three-tier infrastructure 110 and at least one HCI 111. There may be two or more three-tier infrastructures 110 and two or more HCIs 111 included in the infrastructure system 101. When a three-tier infrastructure 110 and a HCI 111 are not distinguished from each other, those two infrastructures are referred to as "infrastructure".

The three-tier infrastructure 110 includes a server 120, a SAN switch 121, and a storage system 122. There may be two or more servers 120, two or more SAN switches 121, and two or more storage systems 122 included in the three-tier infrastructure 110.

The server 120 includes a CPU, a memory, a storage device, and a network interface, which are not shown. The SAN switch 121 includes a controller and a port, which are not shown. The storage system 122 includes: a controller (not shown) including a plurality of microprocessors (MP); and a plurality of storage devices (not shown). The storage device is, for example, a hard disk drive (HDD) and a solid state drive (SSD).

The VM 130 is configured to operate on the server 120. The storage system 122 constructs a pool 140 based on the plurality of storage devices, and allocates a part of the storage area of the pool 140 to the volume 160.

The HCI 111 includes the at least one server 120. There may be two or more servers 120 included in the HCI 111. The HCI 111 is managed in units of HCI cluster constructed by one or more servers 120.

The VM 130 is configured to operate on the server 120. Further, the server 120 constructs a data store 150 based on a storage device of each of the servers 120, and allocates a part of the storage area of the data store 150 to the volume 160.

The management server 100 is configured to monitor operation states of the three-tier infrastructure 110 and the HCI 111 included in the infrastructure system 101, and support migration of a business system between the infrastructures 110 and 111.

As illustrated in FIG. 2, the management server 100 includes a CPU 200, a network interface 201, a memory 202, and a storage device 203. Those pieces of hardware are coupled to one another via a bus 204. The management server 100 may include an input device such as a keyboard, a mouse, or a touch panel, and an output device, for example, a display.

The CPU 200 is configured to execute a program stored in the memory 202. The CPU 200 operates as a function module configured to implement a specific function by executing processing in accordance with the program. In the following description, a sentence describing processing with a function module as the subject of the sentence means that a program for implementing the function module is executed by the CPU 200.

The CPU 200 in the first embodiment serves as a monitoring module 210 and an analysis module 211. The monitoring module 210 is configured to monitor respective operation states of the three-tier infrastructure 110 and the HCI 111. The analysis module 211 is configured to determine whether migration of the business system on the infrastructure is required, and to generate a migration schedule.

Regarding each function module included in the management server 100, a plurality of function modules may be integrated into one function module, or one function module may be divided into a plurality of function modules for each function.

The network interface 201 is an interface for coupling to an external apparatus via a network.

The storage device 203 is a storage device for storing data permanently. The storage device 203 is, for example, an HDD or an SSD. The storage device 203 stores three-tier configuration information 220, three-tier server configuration information 221, HCI configuration information 222, HCI server information 223, three-tier server monitoring information 224, three-tier pool monitoring information 225, three-tier volume monitoring information 226, HCI server monitoring information 227, HCI pool monitoring information 228, and HCI volume monitoring information 229.

The three-tier configuration information 220 stores information on the configuration of the storage system 122 in the three-tier infrastructure 110. Details of the data structure of the three-tier configuration information 220 are described with reference to FIG. 3.

The three-tier server configuration information 221 stores information on the configuration of the server 120 in the three-tier infrastructure 110. Details of the data structure of the three-tier server configuration information 221 are described with reference to FIG. 4.

The HCI configuration information 222 stores information on the configuration in the HCI 111. Details of the data structure of the HCI configuration information 222 are described with reference to FIG. 5.

The HCI server information 223 stores information on the configuration of the server 120 in the HCI 111. Details of the data structure of the HCI server information 223 are described with reference to FIG. 6.

The three-tier server monitoring information 224 stores results of monitoring the operation state of the server 120 in the three-tier infrastructure 110. Details of the data structure of the three-tier server monitoring information 224 are described with reference to FIG. 7.

The three-tier pool monitoring information 225 stores results of monitoring the operation state relating to the pool 140 in the three-tier infrastructure 110. Details of the data structure of the three-tier pool monitoring information 225 are described with reference to FIG. 8.

The three-tier volume monitoring information 226 stores results of monitoring the operation state relating to the volume 160 in the three-tier infrastructure 110. Details of the data structure of the three-tier volume monitoring information 226 are described with reference to FIG. 9.

The HCI server monitoring information 227 stores results of monitoring the operation state of the server 120 in the HCI 111. Details of the data structure of the HCI server monitoring information 227 are described with reference to FIG. 10.

The HCI pool monitoring information 228 stores results of monitoring the operation state relating to the data store 150 in the HCI 111. Details of the data structure of the HCI pool monitoring information 228 are described with reference to FIG. 11.

The HCI volume monitoring information 229 stores results of monitoring the operation state relating to the volume 160 in the HCI 111. Details of the data structure of the HCI volume monitoring information 229 are described with reference to FIG. 12.

The memory 202 stores a program to be executed by the CPU 200 and various kinds of information. The memory 202 stores programs for implementing the monitoring module 210 and the analysis module 211, and stores volume evaluation information 230, threshold value information 231, migration requirement determination information 232, and pattern evaluation information 233.

The volume evaluation information 230 stores an indicator indicating which of the three-tier infrastructure 110 and the HCI 111 the volume 160 is appropriate for. Details of the data structure of the volume evaluation information 230 are described with reference to FIG. 13.

The threshold value information 231 stores a threshold value for determining whether migration of the business system on the infrastructure is required. Details of the data structure of the threshold value information 231 are described with reference to FIG. 14.

The migration requirement determination information 232 stores results of determining whether migration of the business system is required. Details of the data structure of the migration requirement determination information 232 are described with reference to FIG. 15.

The pattern evaluation information 233 stores an evaluation for a migration pattern being a combination of a component in a migration source and a component in a migration destination. Details of the data structure of the pattern evaluation information 233 are described with reference to FIG. 16.

The storage device 203 stores information for managing the configuration of the business system, which is not shown. The information stores an entry including identification information of the business system, information on the infrastructure being used, identification information of the VM 130, and identification information of the volume 160.

The program and information stored in the memory 202 may be stored in the storage device 203. In this case, the CPU 200 reads out the program and information from the storage device 203, and stores the program and information into the memory 202.

Information stored in the storage device 203 may be stored in the memory 202.

A management system constructed by a plurality of computers may be used to implement the functions equivalent to those of the management server 100.

Referring to FIG. 3 to FIG. 16, description is made of details of information managed by the management server 100.

FIG. 3 is a table for showing an example of the data structure of the three-tier configuration information 220 in the first embodiment.

The three-tier configuration information 220 stores an entry including a storage ID 301, a pool ID 302, a capacity 303, a capacity threshold value 304, an MP threshold value 305, a volume type 306, a volume cost 307, an MP cost 308, and a function 309. There is one entry for one combination of the storage system 122 and the pool 140.

The storage ID 301 is a field that stores identification information of the storage system 122 included in the three-tier infrastructure 110. The pool ID 302 is a field that stores identification information of the pool 140. The capacity 303 is a field that stores a capacity of the pool 140.

The capacity threshold value 304 is a field that stores a threshold value for the usage amount of the pool 140 being an indicator for estimating a load of the three-tier infrastructure 110. The MP threshold value 305 is a field that stores a threshold value for the usage rate of the MP being an indicator for estimating a load of the three-tier infrastructure 110.

The capacity threshold values 304 and the MP threshold values 305 of entries having the same storage ID 301 all have the same value.

The volume type 306 is a field that stores a type of the storage device constructing the pool 140. When "SSD" is set as the volume type 306, this means the fact that the pool 140 is generated by using a RAID group constructed only by SSDs. When "HDD" is set as the volume type 306, this means the fact that the pool 140 is generated by using a RAID group constructed only by HDDs. When "HDD/SSD" is set as the volume type 306, this means the fact that the pool 140 is generated by using a RAID group constructed by HDDs and SSDs.

The volume cost 307 is a field that stores a cost per unit capacity of the pool 140. The MP cost 308 is a field that stores a cost of the MP for the storage system 122.

The function 309 is a group of fields that store information on the storage function set for the pool 140. The function 309 includes a copy 311, an optimization 312, and a compression/deduplication 313. The above-mentioned fields included in the function 309 are only one example, and are not limited thereto.

The copy 311 is a field that stores generations (number of copies) of the pool 140. The copy 311 stores a number that correspond to the generation of the pool 140. In a case where there is no generation of the pool 140, the copy 311 is vacant.

The optimization 312 stores a value indicating whether the optimization function is valid. In a case where the optimization function is set, "valid" is stored in the optimization 312, whereas in a case where the optimization function is not set, the optimization 312 is vacant.

The compression/deduplication 313 stores a value indicating whether the compression function and the deduplication function are valid. In a case where the compression function and the deduplication function are set, "valid" is stored in the compression/deduplication 313, whereas in a case where the compression function and the deduplication function are not set, the compression/deduplication 313 is vacant.

Figure 4:
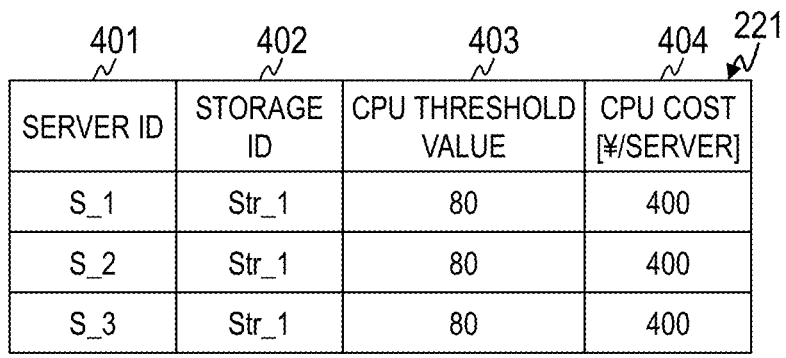
FIG. 4 is a table for showing an example of the data structure of three-tier server configuration information in the first embodiment.

FIG. 4 is a table for showing an example of the data structure of the three-tier server configuration information 221 in the first embodiment.

The three-tier server configuration information 221 stores an entry including a server ID 401, a storage ID 402, a CPU threshold value 403, and a CPU cost 404. There is one entry for one server 120.

The server ID 401 is a field that stores identification information of the server 120 included in the three-tier infrastructure 110. The storage ID 402 is a field that stores identification information of the storage system 122 to be coupled to the server 120.

The CPU threshold value 403 is a field that stores a threshold value for the usage rate of the CPU being an indicator for estimating a load of the three-tier infrastructure 110.

The CPU cost 404 is a field that stores the cost of the CPU for the server 120.

FIG. 5 is a table for showing an example of the data structure of the HCl configuration information 222 in the first embodiment.

The HCl configuration information 222 stores an entry including a cluster ID 501, a capacity 502, a capacity threshold value 503, a volume type 504, a volume cost 505, and a function 506. There is one entry for one HCl 111.

The cluster ID 501 is a field that stores identification information of the HCl 111 (cluster). The capacity 502 is a field that stores the capacity of the data store 150 of the HCl 111.

The capacity threshold value 503 is a field that stores a threshold value for the usage amount of the data store 150 being an indicator for estimating a load of the HCl 111.

The volume type 504 is a field that stores a type of the storage device 203 constructing the data store 150.

The volume cost 505 is a field that stores a cost per unit capacity of the data store 150.

The function 506 is a group of fields that store information on the storage function included in the HCl 111. The function 506 includes a copy 511, an optimization 512, and a compression/deduplication 513. The above-mentioned fields included in the function 309 are only one example, and are not limited thereto.

The copy 511 is a field that stores generations (number of copies) of the data store 150. The copy 511 stores a number that corresponds to the generation of the data store 150. In a case where there is no generation of the data store 150, the copy 511 is vacant.

The optimization 512 stores a value indicating whether the optimization function is valid. In a case where the optimization function is set, "valid" is stored in the optimization 512, whereas in a case where the optimization function is not set, the optimization 512 is vacant.

The compression/deduplication 513 stores a value indicating whether the compression function and the deduplication function are valid. In a case where the compression function and the deduplication function are set, "valid" is stored in the compression/deduplication 513, whereas in a case where the compression function and the deduplication function are not set, the compression/deduplication 513 is vacant.

FIG. 6 is a table for showing an example of the data structure of the HCl server information 223 in the first embodiment.

The HCl server information 223 stores an entry including a server ID 601, a cluster ID 602, a CPU threshold value 603, and a CPU cost 604. There is one entry for one server 120.

The server ID 601 is a field that stores identification information of the server 120. The cluster ID 602 is a field that stores identification information of a cluster (HCl 111) to which the server 120 belongs.

The CPU threshold value 603 is a field that stores a threshold value for the usage rate of the CPU being an indicator for estimating a load of the HCl 111. The CPU threshold values 603 of entries having the same cluster ID 602 all have the same value.

The CPU cost 604 is a field that stores the cost of the CPU for the server 120.

FIG. 7 is a table for showing an example of the data structure of the three-tier server monitoring information 224 in the first embodiment.

The three-tier server monitoring information 224 stores an entry including a date and time 701, a server ID 702, and a CPU usage rate 703. One entry corresponds to results of monitoring the operation state of one server 120.

The date and time 701 is a field that stores a date and time at which the operation state of the server 120 is measured.

The server ID 702 is the same field as the server ID 401.

The CPU usage rate 703 is a field that stores the usage rate of the CPU of the server 120.

FIG. 8 is a table for showing an example of the data structure of the three-tier pool monitoring information 225 in the first embodiment.

The three-tier pool monitoring information 225 stores an entry including a date and time 801, a storage ID 802, a pool ID 803, a usage amount 804, and an MP usage rate 805. One entry corresponds to results of monitoring the operation state of one pool 140 in one storage system 122.

The date and time 801 is a field that stores a date and time at which the operation state of the pool 140 is measured.

The storage ID 802 and the pool ID 803 are the same fields as the storage ID 301 and the pool ID 302.

The usage amount 804 is a field that stores the usage amount of the pool 140.

The MP usage rate 805 is a field that stores the usage rate of the MP of the storage system 122 managing the pool 140.

Figure 9:
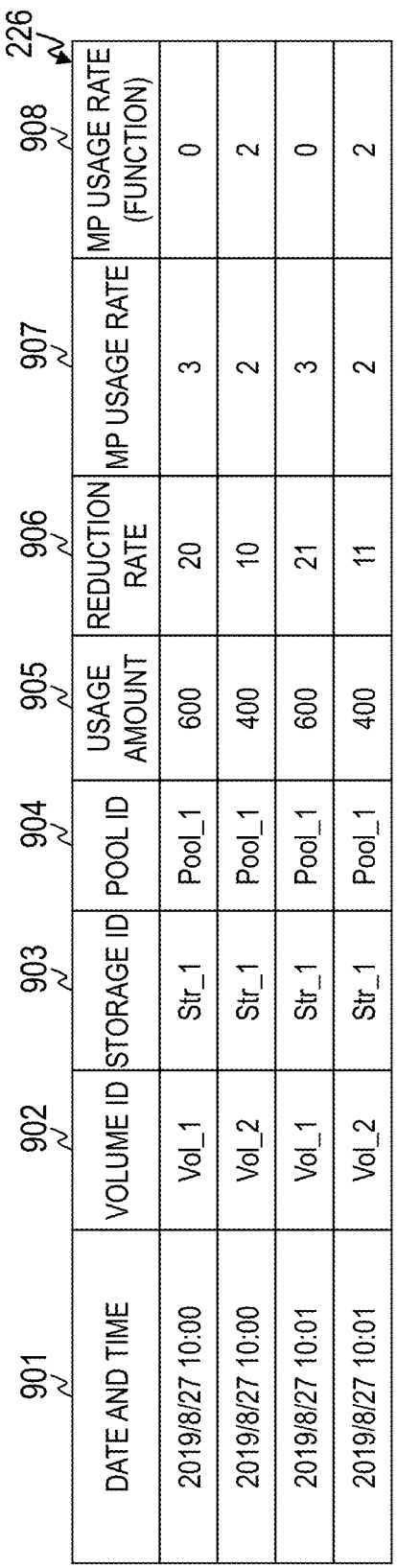
FIG. 9 is a table for showing an example of the data structure of three-tier volume monitoring information in the first embodiment.

FIG. 9 is a table for showing an example of the data structure of the three-tier volume monitoring information 226 in the first embodiment.

The three-tier volume monitoring information 226 stores an entry including a date and time 901, a volume ID 902, a storage ID 903, a pool ID 904, a usage amount 905, a reduction rate 906, an MP usage rate 907, and an MP usage rate (function) 908. One entry corresponds to results of monitoring the operation state of one volume 160.

The date and time 901 is a field that stores a date and time at which the operation state of the volume 160 is measured.

The volume ID 902 is a field that stores identification information of the volume 160.

The storage ID 903 is a field that stores identification information of the storage system 122 allocating a storage area to the volume 160.

The pool ID 904 is a field that stores identification information of the pool 140 to which the storage area of the volume 160 is allocated.

The usage amount 905 is a field that stores the capacity of the volume 160.

The reduction rate 906 is a field that stores a reduction rate of the capacity in a case where the compression function and the deduplication function are used.

The MP usage rate 907 is a field that stores a usage rate of the MP of the storage system 122 allocating the storage area to the volume 160.

The MP usage rate (function) 908 is a field that stores a usage rate of the MP of the storage system 122 used by the storage function.

FIG. 10 is a table for showing an example of the data structure of the HCl server monitoring information 227 in the first embodiment.

The HCl server monitoring information 227 stores an entry including a date and time 1001, a server ID 1002, and a CPU usage rate 1003. One entry corresponds to results of monitoring the operation state of one server 120.

The date and time 1001 is a field that stores a date and time at which the operation state of the server 120 is measured.

The server ID 1002 is the same field as the server ID 601.

The CPU usage rate 1003 is a field that stores the usage rate of the CPU of the server 120.

FIG. 11 is a table for showing an example of the data structure of the HCl pool monitoring information 228 in the first embodiment.

The HCl pool monitoring information 228 stores an entry including a date and time 1101, a cluster ID 1102, and a usage amount 1103. One entry corresponds to results of monitoring the operation state of the data store 150 in one HCl 111.

The date and time 1101 is a field that stores a date and time at which the operation state of the data store 150 is measured.

The cluster ID 1102 is a field that stores identification information of the HCl 111. One data store 150 is generated in the HCl 111, and thus the identification information of the HCl 111 is used as identification information of the data store 150.

The usage amount 1103 is a field that stores the usage amount of the data store 150.

FIG. 12 is a table for showing an example of the data structure of the HCl volume monitoring information 229 in the first embodiment.

The HCl volume monitoring information 229 stores an entry including a date and time 1201, a volume ID 1202, a server ID 1203, a cluster ID 1204, a usage amount 1205, a reduction rate 1206, a CPU usage rate 1207, and a CPU usage rate (function) 1208. One entry corresponds to results of monitoring the operation state of one volume 160.

The date and time 1201 is a field that stores a date and time at which the operation state of the volume 160 is measured.

The volume ID 1202 is a field that stores identification information of the volume 160.

The server ID 1203 is a field that stores identification information of the server 120 allocating a storage area to the volume 160.

The cluster ID 1204 is a field that stores identification information of a cluster to which the server 120 allocating the storage area to the volume 160 belongs.

The usage amount 1205 is a field that stores the capacity of the volume 160.

The reduction rate 1206 is a field that stores a reduction rate of the capacity in a case where the compression function and the deduplication function are used.

The CPU usage rate 1207 is a field that stores a usage rate of the CPU of the server 120 allocating the storage area to the volume 160.

The CPU usage rate (function) 1208 is a field that stores a usage rate of the CPU of the server 120 used by the storage function.

FIG. 13 is a table for showing an example of the data structure of the volume evaluation information 230 in the first embodiment.

The volume evaluation information 230 includes a three-tier volume evaluation table 1300 and an HCI volume evaluation table 1310.

The three-tier volume evaluation table 1300 is information for managing evaluation values of the volume 160 using the pool 140 of the three-tier infrastructure 110. The three-tier volume evaluation table 1300 stores an entry including a volume ID 1301, a first infrastructure evaluation value 1302, and a second infrastructure evaluation value 1303. There is one entry for one volume 160.

The volume ID 1301 is a field that stores identification information of the volume 160. The first infrastructure evaluation value 1302 and the second infrastructure evaluation value 1303 are fields that store evaluation values (first infrastructure evaluation value and second infrastructure evaluation value) of the volume 160, respectively. Details of the first infrastructure evaluation value and the second infrastructure evaluation value are described later.

The HCI volume evaluation table 1310 is information for managing evaluation values of the volume 160 using the data store 150 of the HCI 111. The HCI volume evaluation table 1310 stores an entry including a volume ID 1311, a first infrastructure evaluation value 1312, and a second infrastructure evaluation value 1313. There is one entry for one volume 160.

The volume ID 1311 is a field that stores identification information of the volume 160. The first infrastructure evaluation value 1312 and the second infrastructure evaluation value 1313 are fields that store evaluation values (first infrastructure evaluation value and second infrastructure evaluation value) of the volume 160, respectively. Details of the first infrastructure evaluation value and the second infrastructure evaluation value are described later.

FIG. 14 is a table for showing an example of the data structure of the threshold value information 231 in the first embodiment.

The threshold value information 231 includes a three-tier threshold value table 1400 and an HCI threshold value table 1410.

The three-tier threshold value table 1400 stores an entry including a storage ID 1401 and a migration threshold value 1402. There is one entry for one storage system 122.

The storage ID 1401 is a field that stores identification information of the storage system 122 included in the three-tier infrastructure 110. The migration threshold value 1402 is a field that stores a threshold value for determining whether migration of the business system operating on the three-tier infrastructure 110 is required.

The HCI threshold value table 1410 stores an entry including a cluster ID 1411 and a migration threshold value 1412. There is one entry for one HCI 111 (cluster).

The cluster ID 1411 is a field that stores identification information of the HCI 111 (cluster). The migration threshold value 1412 is a field that stores a threshold value for determining whether migration of the business system operating on the HCI 111 is required.

FIG. 15 is a table for showing an example of the data structure of the migration requirement determination information 232 in the first embodiment. The migration requirement determination information 232 stores results of determining whether migration of the business system is required.

The migration requirement determination information 232 includes a three-tier migration requirement determination table 1500 and an HCI migration requirement determination table 1510.

The three-tier migration requirement determination table 1500 stores an entry including a storage ID 1501, a pool ID 1502, and a determination result 1503. There is one entry for one combination of the storage system 122 and the pool 140.

The storage ID 1501 is a field that stores identification information of the storage system 122 included in the three-tier infrastructure 110. The pool ID 1502 is a field that stores identification information of the pool 140. The determination result 1503 is a field that stores a value indicating whether migration of the business system using the pool 140 is required. The determination result 1503 stores any one of "required" indicating the fact that migration is required and "not required" indicating the fact that migration is not required.

The HCI migration requirement determination table 1510 stores an entry including a server ID 1511 and a determination result 1512. There is one entry for one server 120.

The server ID 1511 is a field that stores identification information of the server 120 constructing the HCI 111. The determination result 1512 is a field that stores a value indicating whether migration of the business system using a storage area of the server 120 corresponding to the server ID 1511 is required. The determination result 1512 stores any one of "required" indicating the fact that migration is required and "not required" indicating the fact that migration is not required.

FIG. 16 is a table for showing an example of the data structure of the pattern evaluation information 233 in the first embodiment.

The pattern evaluation information 233 includes a three-tier pattern evaluation table 1600 and an HCI pattern evaluation table 1610.

The three-tier pattern evaluation table 1600 stores an entry including a pattern ID 1601, a pattern 1602, a feasibility 1603, and a cost 1604. There is one entry for one migration pattern.

The pattern ID 1601 is a field that stores identification information of a migration pattern that defines migration from the HCI 111 to the three-tier infrastructure 110.

The pattern 1602 is a group of fields that store a pattern indicating an association relationship between a volume serving as a migration source and the pool 140 serving as a migration destination. The pattern 1602 includes the same number of fields as that of volumes serving as a migration source. Information on the pool 140 serving as a migration destination is stored in each field.

The feasibility 1603 is a field that stores a value indicating whether migration corresponding to a migration pattern can be executed. The feasibility 1603 stores any one of "feasible" indicating the fact that migration corresponding to the migration pattern can be executed and "not feasible" indicating the fact that migration corresponding to the migration pattern cannot be executed.

The cost 1604 is a field that stores a cost required for operation of the business system after execution of migration corresponding to the migration pattern.

The HCI pattern evaluation table 1610 stores an entry including a pattern ID 1611, a pattern 1612, a feasibility 1613, and a cost 1614. There is one entry for one migration pattern.

The pattern ID 1611 is a field that stores identification information of a migration pattern that defines migration from the three-tier infrastructure 110 to the HCI 111.

The pattern 1612 is a group of fields that store a pattern indicating an association relationship between a volume serving as a migration source and the server 120 serving as a migration destination. The pattern 1612 includes the same number of fields as that of volumes serving as a migration source. Information on the server 120 serving as a migration destination is stored in each field.

The feasibility 1613 is a field that stores a value indicating whether migration corresponding to a migration pattern can be executed. The feasibility 1613 stores any one of "feasible" indicating the fact that migration corresponding to the migration pattern can be executed and "not feasible" indicating the fact that migration corresponding to the migration pattern cannot be executed.

The cost 1614 is a field that stores a cost required for operation of the business system after execution of migration corresponding to the migration pattern.

Next, processing to be executed by the management server 100 is described.

Figure 17:
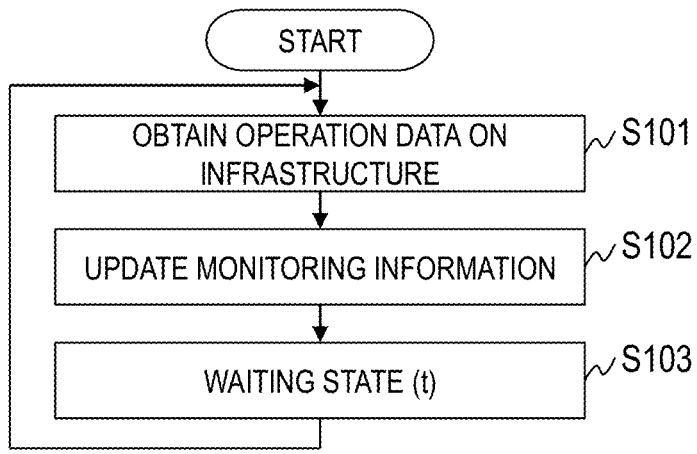
FIG. 17 is a flow chart for illustrating an example of monitoring processing to be executed by the management server in the first embodiment.

FIG. 17 is a flow chart for illustrating an example of monitoring processing to be executed by the management server 100 in the first embodiment.

The monitoring module 210 is configured to execute processing described below periodically. The period for execution of the processing can be set in any manner.

The monitoring module 210 obtains operation data on the infrastructures 110 and 111 from the infrastructure system 101 (Step S101). It suffices that a publicly known method is used as a method of obtaining the operation data, and thus a detailed description thereof is omitted here.

Next, the monitoring module 210 updates monitoring information based on the obtained operation data (Step S102).

For example, the monitoring module 210 stores the obtained operation data into the monitoring information. Further, the monitoring module 210 may execute conversion processing and statistical processing using the operation data, and store the processing results into the monitoring information. In the first embodiment, the three-tier server monitoring information 224, the three-tier pool monitoring information 225, the three-tier volume monitoring information 226, the HCI server monitoring information 227, the HCI pool monitoring information 228, and the HCI volume monitoring information 229 are updated.

Next, the monitoring module 210 transitions to a standby state (Step S103), and after a fixed period of time (t) has elapsed, the monitoring module 210 returns to Step S101 to execute similar processing.

In a case where the monitoring module 210 has received an execution instruction, the monitoring module 210 may execute processing of Step S101 and Step S102.

Figure 18:
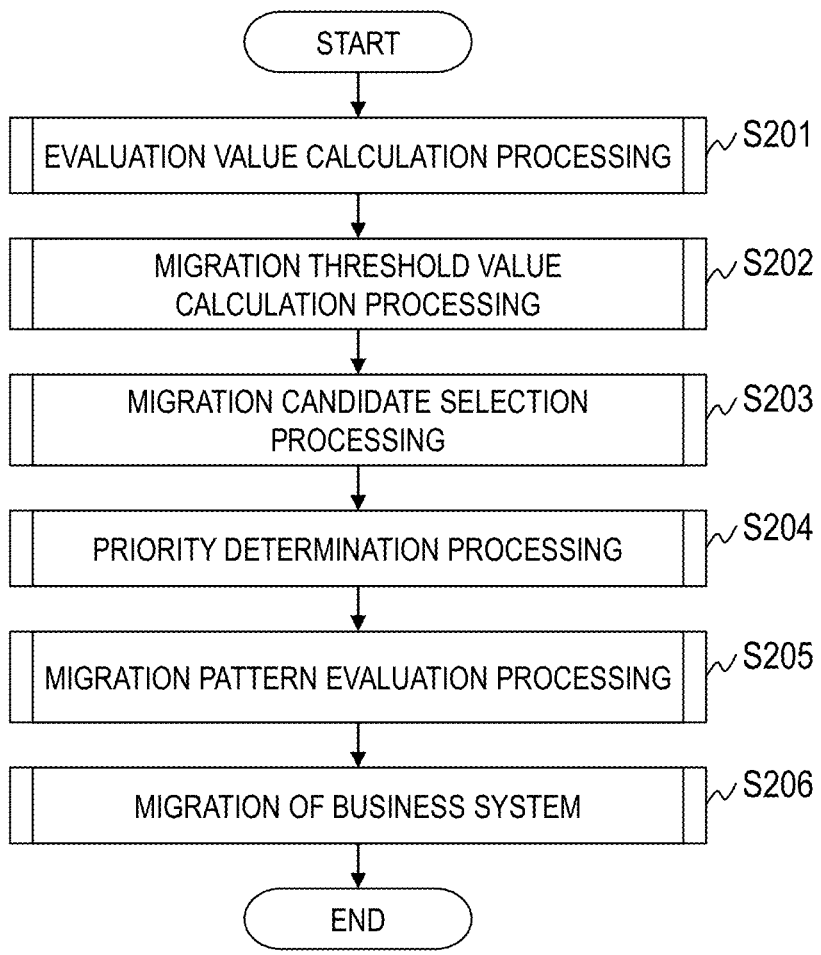
FIG. 18 is a flow chart for illustrating an outline of migration control processing to be executed by the management server in the first embodiment.

FIG. 18 is a flow chart for illustrating an outline of migration control processing to be executed by the management server 100 in the first embodiment.

In a case where the analysis module 211 has detected an execution trigger or received an execution instruction, the analysis module 211 executes processing described below. The analysis module 211 may execute the processing described below periodically. The monitoring processing and migration control processing may be executed in synchronization with each other, or may be executed in an asynchronous manner.

The analysis module 211 executes evaluation value calculation processing to calculate an evaluation value for evaluating whether the infrastructure of the business system using the infrastructure system 101 is appropriate (Step S201). Details of the evaluation value calculation processing are described with reference to FIG. 19.

Next, the analysis module 211 executes migration threshold value calculation processing (Step S202). Details of the migration threshold value calculation processing are described with reference to FIG. 20.

Next, the analysis module 211 executes migration candidate selection processing to select a business system being a migration candidate based on the operation states of the infrastructures 110 and 111, the evaluation value, and the threshold value (Step S203). In the first embodiment, the business system being a migration candidate is selected in units of volume 160. Details of the migration candidate selection processing are described with reference to FIG. 21A and FIG. 21B.

Next, the analysis module 211 executes priority determination processing to determine a priority of the business system being a migration candidate (Step S204). Details of the priority determination processing are described with reference to FIG. 22.

Next, the analysis module 211 executes migration pattern evaluation processing of generating and evaluating a migration pattern (Step S205). Details of the migration pattern evaluation processing are described with reference to FIG. 23A, FIG. 23B, FIG. 23C, and FIG. 23D.

Next, the analysis module 211 executes processing of migrating the business system (Step S206). Details of the processing of migrating the business system are described with reference to FIG. 24.

The evaluation value calculation processing, the migration threshold value calculation processing, the migration candidate selection processing, and the priority determination processing are processing relating to the infrastructure being a migration source. The migration pattern evaluation processing is processing relating to the infrastructure being a migration destination.

Figure 19:
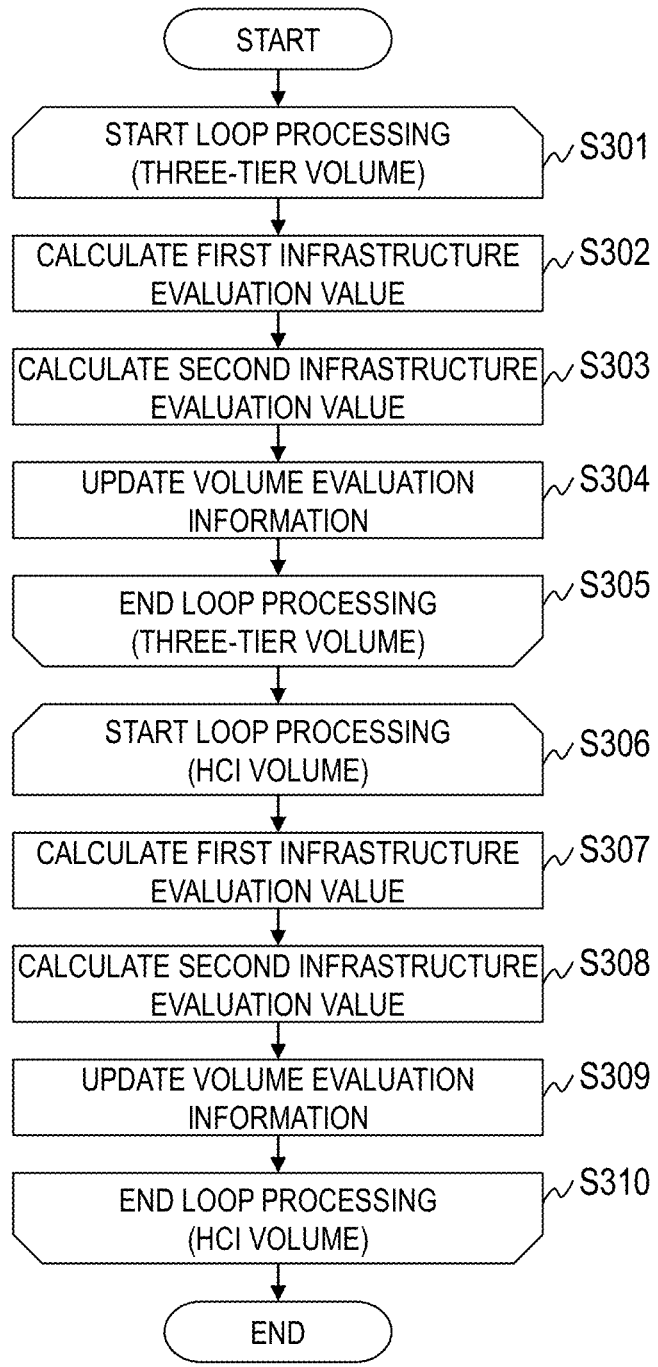
FIG. 19 is a flow chart for illustrating an example of evaluation value calculation processing to be executed by the management server in the first embodiment.

FIG. 19 is a flow chart for illustrating an example of the evaluation value calculation processing to be executed by the management server 100 in the first embodiment.

The analysis module 211 starts loop processing for the volumes 160 using the pool 140 of the three-tier infrastructure 110 (Step S301).

Specifically, the analysis module 211 refers to configuration information on the business system, and identifies the volumes 160 of the business system using the three-tier infrastructure 110. The analysis module 211 selects one first target volume 160 from among the identified volumes 160.

Next, the analysis module 211 calculates a first infrastructure evaluation value of the first target volume 160 (Step S302). Specifically, the following processing is executed.

(Step S302-1) The analysis module 211 refers to the three-tier volume monitoring information 226 to retrieve the latest entry storing identification information of the first target volume 160 in the volume ID 902. The analysis module 211 temporarily stores the retrieved entry into a work area.

(Step S302-2) The analysis module 211 refers to the three-tier configuration information 220 to retrieve an entry for which the storage ID 301 and the pool ID 302 match the storage ID 903 and the pool ID 904 of the retrieved entry, respectively. The analysis module 211 temporarily stores the retrieved entry into the work area.

(Step S302-3) The analysis module 211 calculates, as a first infrastructure evaluation value, a ratio of usage rates of the calculation resource and the storage resource of the first target volume 160 in the three-tier infrastructure 110. For example, the analysis module 211 calculates the first infrastructure evaluation value based on Expression (1).

$$\frac{\text{usage amount}/(\text{pool capacity} \times \text{capacity threshold value})}{(MP \text{ usage rate} \times MP \text{ threshold value})} \qquad (1)$$

The usage amount and the MP usage rate of Expression (1) are values of the usage amount 905 and the MP usage rate 907 of the entry obtained from the three-tier volume monitoring information 226, respectively. The pool capacity, the capacity threshold value, and the MP threshold value of Expression (1) are values of the capacity 303, the capacity threshold value 304, and the MP threshold value 305 of the entry obtained from the three-tier configuration information 220, respectively.

The first infrastructure evaluation value is an indicator representing a balance between usage ratios of the calculation resource and the storage resource of the business system (volume 160). As the first infrastructure evaluation value becomes closer to 1, this means the fact that there is less deviation between usage ratios of the calculation resource and the storage resource.

In a case where the usage ratio of the calculation resource of the business system and the usage ratio of the storage resource of the business system are equal to each other, the calculation resource and the storage resource for the business system may be added at the same degree of ratio. In this case, usage of the HCl 110 enabling increase/decrease of resources in units of server 120 is recommended. On the other hand, in a case where there is a deviation between usage ratios of the calculation resource and the storage resource of the business system, one of allocation amounts of the calculation resource and the storage resource of the business system is required to be set larger than the other. In this case, usage of the three-tier infrastructure 110 enabling separate increase/decrease of the server 120 and the storage system 122 is recommended.

Therefore, the first infrastructure evaluation value can be used as an indicator for determining an infrastructure appropriate for the business system (volume 160).

This concludes the description of the processing of Step S302.

Next, the analysis module 211 calculates a second infrastructure evaluation value of the first target volume 160 (Step S303).

Specifically, the analysis module 211 calculates, as a second infrastructure evaluation value, a ratio of the usage amount of the calculation resource for the storage function to the usage amount of the calculation resource for the infrastructure. For example, the analysis module 211 calculates the second infrastructure evaluation value based on Expression (2).

$$\frac{MP \text{ usage rate (function)}}{MP \text{ usage rate}} \qquad (2)$$

The MP usage rate and the MP usage rate (function) of Expression (2) are values of the MP usage rate 907 and the MP usage rate (function) 908 of the entry obtained from the three-tier volume monitoring information 226, respectively.

The second infrastructure evaluation value represents a magnitude of the influence of the storage function of the business system (volume 160). As the second infrastructure evaluation value becomes closer to 1, this means the fact that the business system has a large load of the storage function. Regarding the business system having a large load of the storage function, usage of the three-tier infrastructure 110 enabling flexible change of the storage resource is recommended.

Therefore, the second infrastructure evaluation value can be used as an indicator for determining an infrastructure appropriate for the business system (volume 160).

Next, the analysis module 211 updates the volume evaluation information 230 (Step S304).

Specifically, the analysis module 211 refers to the three-tier volume evaluation table 1300 to retrieve an entry for which the identification information of the first target volume 160 is set as the volume ID 1301. The analysis module 211 sets the calculated first infrastructure evaluation value and second infrastructure evaluation value as the first infrastructure evaluation value 1302 and the second infrastructure evaluation value 1303 of the retrieved entry, respectively.

In a case where there is no entry in which the identification information of the first target volume 160 is set as the volume ID 1301, the analysis module 211 adds an entry to the three-tier volume evaluation table 1300, and sets the identification information of the first target volume 160 as the volume ID 1301 of the added entry. Further, the analysis module 211 sets the calculated first infrastructure evaluation value and second infrastructure evaluation value as the first infrastructure evaluation value 1302 and the second infrastructure evaluation value 1303 of the added entry, respectively.

After the analysis module 211 has updated the volume evaluation information 230, the analysis module 211 deletes the entries stored in the work area.

Next, the analysis module 211 determines whether the processing is complete for all the volumes 160 using the pool 140 of the three-tier infrastructure 110 (Step S305).

In a case where the processing is not complete for all the volumes 160 using the pool 140 of the three-tier infrastructure 110, the analysis module 211 returns to Step S301 to execute similar processing.

In a case where the processing is complete for all the volumes 160 using the pool 140 of the three-tier infrastructure 110, the analysis module 211 starts loop processing for the volumes 160 using the data store 150 of the HCl 111 (Step S306).

Specifically, the analysis module 211 refers to configuration information on the business system, and identifies the volumes 160 of the business system using the HCl 111. The analysis module 211 selects one second target volume 160 from among the identified volumes 160.

Next, the analysis module 211 calculates a first infrastructure evaluation value of the second target volume 160 (Step S307). Specifically, the following processing is executed.

(Step S307-1) The analysis module 211 refers to the HCl volume monitoring information 229 to retrieve the latest entry storing identification information of the second target volume 160 in the volume ID 1202. The analysis module 211 temporarily stores the retrieved entry into the work area.

(Step S307-2) The analysis module 211 refers to the HCl configuration information 222 to retrieve an entry for which the cluster ID 501 matches the cluster ID 1204 of the retrieved entry. The analysis module 211 temporarily stores the retrieved entry into the work area.

(Step S307-3) The analysis module 211 refers to the HCl server information 223 to retrieve an entry for which the cluster ID 602 matches the cluster ID 1204 of the retrieved entry. The analysis module 211 temporarily stores the retrieved entry into the work area.

(Step S307-4) The analysis module 211 calculates, as a first infrastructure evaluation value, a ratio of usage rates of the calculation resource and the storage resource of the second target volume 160 in the HCl 111. For example, the analysis module 211 calculates the first infrastructure evaluation value based on Expression (3).

$$\frac{\text{usage amount}/(\text{capacity} \times \text{capacity threshold value})}{(\text{CPU usage rate} \times \text{CPU threshold value})} \quad (3)$$

The usage amount and the CPU usage rate of Expression (3) are values of the usage amount 1205 and the CPU usage rate 1207 of the entry obtained from the HCl volume monitoring information 229, respectively. The capacity and the capacity threshold value of Expression (3) are values of the capacity 502 and the capacity threshold value 503 of the entry obtained from the HCl configuration information 222, respectively. The CPU threshold value of Expression (3) is a value of the CPU threshold value 603 of the entry obtained from the HCl server information 223.

Next, the analysis module 211 calculates a second infrastructure evaluation value of the second target volume 160 (Step S308).

Specifically, the analysis module 211 calculates, as a second infrastructure evaluation value, a ratio of the usage amount of the calculation resource for the storage function to the usage amount of the calculation resource for the infrastructure. For example, the analysis module 211 calculates the second infrastructure evaluation value based on Expression (4).

$$\frac{CPU \text{ usage rate (function)}}{CPU \text{ usage rate}} \quad (4)$$

The CPU usage rate and the CPU usage rate (function) of Expression (4) are values of the CPU usage rate 1207 and the CPU usage rate (function) 1208 of the entry obtained from the HCl volume monitoring information 229, respectively.

Next, the analysis module 211 updates the volume evaluation information 230 (Step S309).

Specifically, the analysis module 211 refers to the HCl volume evaluation table 1310 to retrieve an entry for which the identification information of the second target volume 160 is set as the volume ID 1311. The analysis module 211 sets the calculated first infrastructure evaluation value and second infrastructure evaluation value as the first infrastructure evaluation value 1312 and the second infrastructure evaluation value 1313 of the retrieved entry, respectively.

In a case where there is no entry in which the identification information of the second target volume 160 is set as the volume ID 1311, the analysis module 211 adds an entry to the HCl volume evaluation table 1310, and sets the identification information of the second target volume 160 as the volume ID 1311 of the added entry. Further, the analysis module 211 sets the calculated first infrastructure evaluation value and second infrastructure evaluation value as the first infrastructure evaluation value 1312 and the second infrastructure evaluation value 1313 of the added entry, respectively.

After the analysis module 211 has updated the volume evaluation information 230, the analysis module 211 deletes the entries stored in the work area.

Next, the analysis module 211 determines whether the processing is complete for all the volumes 160 using the data store 150 of the HCl 111 (Step S310).

In a case where the processing is not complete for all the volumes 160 using the data store 150 of the HCl 111, the analysis module 211 returns to Step S306 to execute similar processing.

In a case where the processing is complete for all the volumes 160 using the data store 150 of the HCl 111, the analysis module 211 finishes the evaluation value calculation processing.

Figure 20:
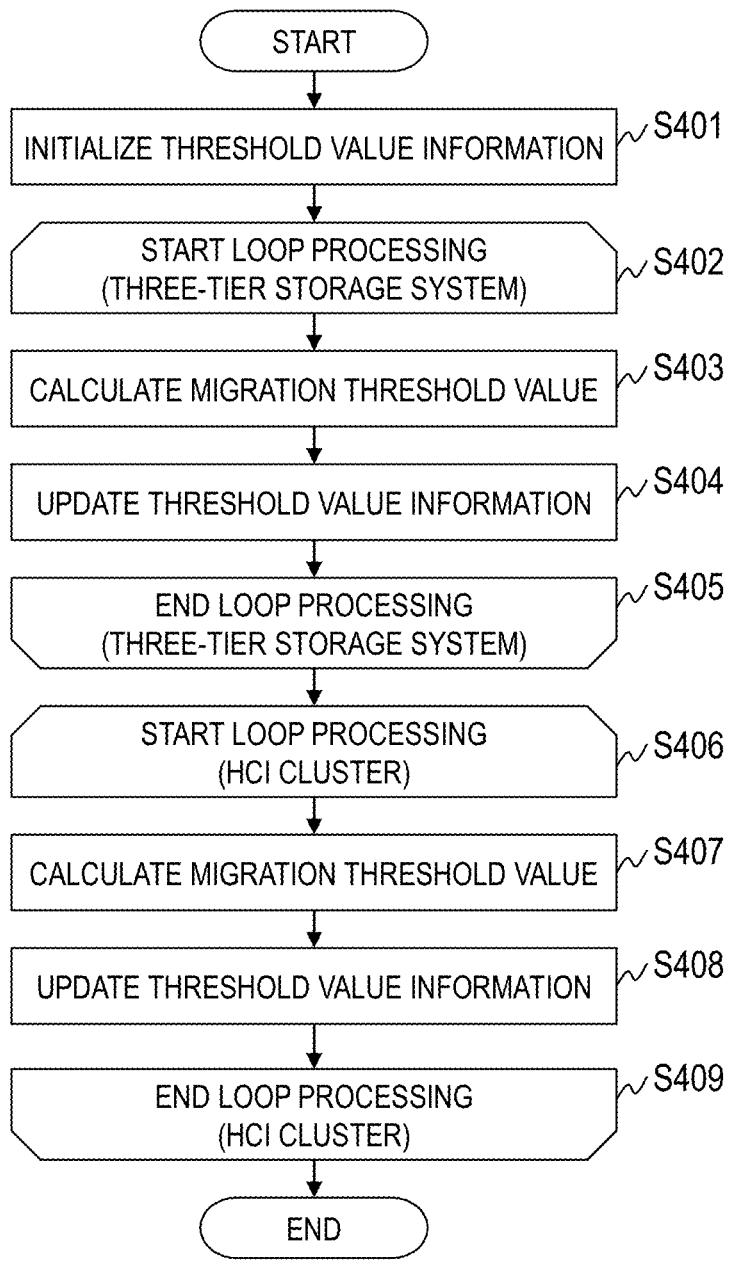
FIG. 20 is a flow chart for illustrating an example of migration threshold value calculation processing to be executed by the management server in the first embodiment.

FIG. 20 is a flow chart for illustrating an example of the migration threshold value calculation processing to be executed by the management server 100 in the first embodiment.

The analysis module 211 initializes the threshold value information 231 (Step S401).

Next, the analysis module 211 starts loop processing for the storage system 122 of the three-tier infrastructure 110 (Step S402).

Specifically, the analysis module 211 refers to the three-tier configuration information 220 to identify the storage systems 122 included in the three-tier infrastructure 110. The analysis module 211 selects one target storage system 122 from among the identified storage systems 122.

Next, the analysis module 211 calculates a migration threshold value of the target storage system 122 (Step S403). Specifically, the following processing is executed.

(Step S403-1) The analysis module 211 refers to the three-tier configuration information 220 to retrieve an entry for which identification information of the target storage system 122 is set as the storage ID 301. The analysis module 211 stores the retrieved entry into the work area.

(Step S403-2) The analysis module 211 obtains, from the three-tier pool monitoring information 225, the latest entry storing identification information of the target storage system 122 in the storage ID 802. Further, the analysis module 211 obtains, from the three-tier pool monitoring information 225, an entry storing the identification information of the target storage system 122 in the storage ID 802, which has a date and time a predetermined period t2 before the latest date and time. The period t2 is a period required for increasing resources, and can be set to any value.

(Step S403-3) The analysis module 211 calculates, as an increase rate of the storage resource, a value obtained by dividing, by t2, a difference between usage amounts 804 of two entries obtained from the three-tier pool monitoring information 225. Further, the analysis module 211 calculates, as an increase rate of the calculation resource, a value obtained by dividing, by t2, a difference between MP usage rates 805 of two entries obtained from the three-tier pool monitoring information 225.

(Step S403-4) The analysis module 211 substitutes the capacity threshold value 304 of the entry obtained from the three-tier configuration information 220 and the increase rate of the storage resource into Expression (5) to calculate a threshold value for the storage resource.

$$\text{storage resource increase rate} + (100 - \text{capacity threshold value}) \tag{5}$$

(Step S403-5) The analysis module 211 substitutes the MP threshold value 305 of the entry obtained from the three-tier configuration information 220 and the increase rate of the calculation resource into Expression (6) to calculate a threshold value for the calculation resource.

$$\text{calculation resource increase rate} + (100 - \text{MP threshold value}) \tag{6}$$

(Step S403-6) The analysis module 211 compares the threshold value for the storage resource with the threshold value for the calculation resource, and determines a larger value as a migration threshold value of the storage system 122.

This concludes the description of the processing of Step S403.

Next, the analysis module 211 updates the threshold value information 231 (Step S404).

Specifically, the analysis module 211 refers to the three-tier threshold value table 1400 to retrieve an entry for which the identification information of the target storage system 122 is set as the storage ID 1401. The analysis module 211 sets the calculated migration threshold value as the migration threshold value 1402.

In a case where there is no entry in which the identification information of the target storage system 122 is set as the storage ID 1401, the analysis module 211 adds an entry to the three-tier threshold value table 1400, and sets the identification information of the target storage system 122 as the storage ID 1401 of the added entry. Further, the analysis module 211 sets the calculated migration threshold value as the migration threshold value 1402 of the added entry.

After the analysis module 211 has updated the threshold value information 231, the analysis module 211 deletes the entries stored in the work area.

Next, the analysis module 211 determines whether the processing is complete for all the storage systems 122 of the three-tier infrastructure 110 (Step S405).

In a case where the processing is not complete for all the storage systems 122 of the three-tier infrastructure 110, the analysis module 211 returns to Step S402 to execute similar processing.

In a case where the processing is complete for all the storage systems 122 of the three-tier infrastructure 110, the analysis module 211 starts loop processing for the HCI 111 (Step S406).

Specifically, the analysis module 211 refers to the HCI configuration information 222, and identifies the HCI 111 (cluster). The analysis module 211 selects one target cluster from among the identified clusters.

Next, the analysis module 211 calculates a migration threshold value of the target cluster (Step S407). Specifically, the following processing is executed.

(Step S407-1) The analysis module 211 refers to the HCI configuration information 222 to retrieve an entry for which identification information of the target cluster as the cluster ID 501. The analysis module 211 stores the retrieved entry into the work area.

(Step S407-2) The analysis module 211 refers to the HCI server information 223 to retrieve an entry for which identification information of the target cluster is set as the cluster ID 602. The analysis module 211 stores the retrieved entry into a work area.

(Step S407-3) The analysis module 211 obtains, from the HCI pool monitoring information 228, the latest entry storing identification information of the target cluster in the cluster ID 1102. Further, the analysis module 211 obtains, from the HCI pool monitoring information 228, an entry storing the identification information of the target cluster in the cluster ID 1102, which has a date and time the predetermined period t2 before the latest date and time. The period t2 is a period required for increasing resources, and can be set to any value.

(Step S407-4) The analysis module 211 calculates, as an increase rate of the storage resource, a value obtained by dividing, by t2, a difference between usage amounts 1103 of two entries obtained from the HCI pool monitoring information 228.

(Step S407-5) The analysis module 211 substitutes the capacity threshold value 503 of the entry obtained from the HCI configuration information 222 and the increase rate of the storage resource into Expression (7) to calculate a threshold value for the storage resource.

$$\text{storage resource increase rate} + (100 - \text{capacity threshold value}) \tag{7}$$

(Step S407-6) The analysis module 211 obtains, from the HCI server monitoring information 227, the latest entry storing identification information of the server 120 belonging to the target cluster in the server ID 1002. Further, the analysis module 211 obtains, from the HCI server monitoring information 227, an entry storing the identification information of the server 120 belonging to the target cluster in the server ID 1002, which has a date and time the predetermined period t2 before the latest date and time. The period t2 is a period required for increasing resources, and can be set to any value.

(Step S407-7) The analysis module 211 calculates, as the increase rate of the calculation resource, a value obtained by dividing, by t2, a difference between CPU usage rates 1003 of two entries obtained from the HCI server monitoring information 227. In a case where there are two or more servers 120 belonging to the target cluster, the increase rate of the calculation resource is calculated for each server 120.

(Step S407-8) The analysis module 211 substitutes the CPU threshold value 603 of the entry obtained from the HCI server information 223 and the increase rate of the calculation resource into Expression (8) to calculate a threshold value for the calculation resource. In a case where there are two or more servers 120 belonging to the target cluster, the threshold value for the calculation resource is calculated for each server 120.

$$\text{calculation resource increase rate} + (100 - \text{CPU threshold value}) \tag{8}$$

(Step S407-9) The analysis module 211 compares the threshold value for the storage resource with the threshold value for the calculation resource, and determines a larger value as a migration threshold value of the target cluster.

This concludes the description of the processing of Step S407.

Next, the analysis module 211 updates the threshold value information 231 (Step S408).

Specifically, the analysis module 211 refers to the HCI threshold value table 1410 to retrieve an entry for which the identification information of the target cluster is set as the cluster ID 1411. The analysis module 211 sets the calculated migration threshold value as the migration threshold value 1412 of the retrieved entry.

In a case where there is no entry in which the identification information of the target cluster is set as the cluster ID 1411, the analysis module 211 adds an entry to the HCI threshold value table 1410, and sets the identification information of the target cluster as the cluster ID 1411 of the added entry. Further, the analysis module 211 sets the calculated migration threshold value as the migration threshold value 1412 of the added entry.

After the analysis module 211 has updated the threshold value information 231, the analysis module 211 deletes the entries stored in the work area.

Next, the analysis module 211 determines whether the processing is complete for all the HCIs 111 (Step S409).

In a case where the processing is not complete for all the HCIs 111, the analysis module 211 returns to Step S406 to execute similar processing.

In a case where the processing is complete for all the HCIs 111, the analysis module 211 finishes the migration threshold value calculation processing.

The threshold value is set dynamically in accordance with the usage state of the infrastructure resource, to thereby be able to perform such control that a business system on an infrastructure for which the increase rate of the usage amount of resources is increasing is migrated preferentially.

Figure 21A:
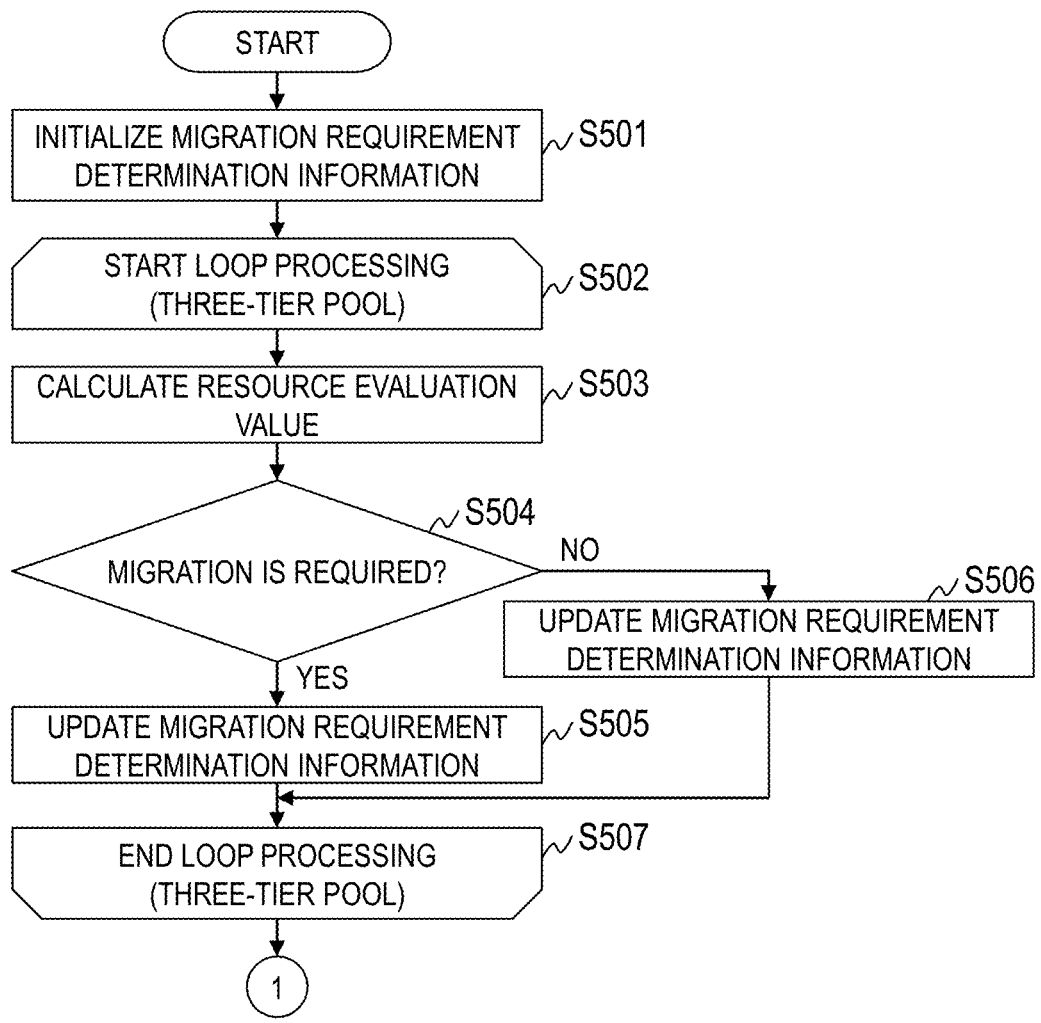
FIG. 21A and FIG. 21B are flow charts for illustrating an example of migration candidate selection processing to be executed by the management server in the first embodiment.
Figure 21B:
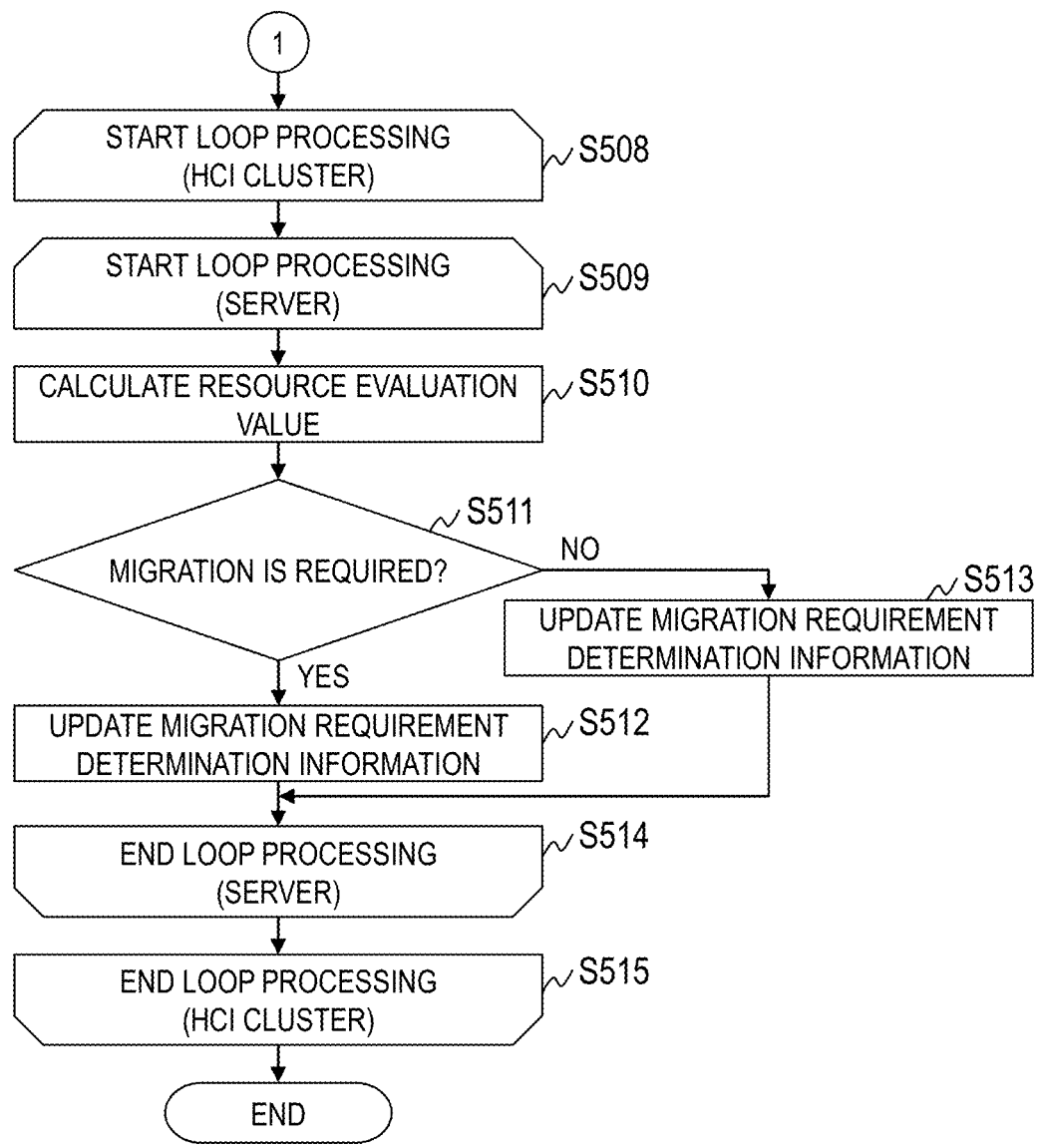

FIG. 21A and FIG. 21B are flow charts for illustrating an example of the migration candidate selection processing to be executed by the management server 100 in the first embodiment.

The analysis module 211 initializes the migration requirement determination information 232 (Step S501).

Next, the analysis module 211 starts loop processing for the pool 140 of the three-tier infrastructure 110 (Step S502).

Specifically, the analysis module 211 selects one target entry from the three-tier configuration information 220.

Next, the analysis module 211 calculates a resource evaluation value of the pool 140 (Step S503). Specifically, the following processing is executed.

(Step S503-1) The analysis module 211 refers to the three-tier pool monitoring information 225 to retrieve the latest entry for which the storage ID 802 and the pool ID 803 match the storage ID 301 and the pool ID 302 of the target entry, respectively. The analysis module 211 stores the retrieved entry into the work area.

(Step S503-2) The analysis module 211 refers to the three-tier threshold value table 1400 to retrieve an entry for which the storage ID 1401 matches the storage ID 301 of the target entry. The analysis module 211 stores the retrieved entry into the work area.

(Step S503-3) The analysis module 211 calculates a first resource evaluation value and a second resource evaluation value based on Expression (9) and Expression (10), respectively.

$$\text{first resource evaluation value} = \frac{\text{usage amount}}{\text{capacity} \times \text{capacity threshold value}} \quad (9)$$

The usage amount of Expression (9) and the MP usage rate of Expression (10) are values of the usage amount 804 and the MP usage rate 805 of the entry obtained from the three-tier pool monitoring information 225, respectively. The capacity and the capacity threshold value of Expression (9) are values of the capacity 303 and the capacity threshold value 304 of the target entry, respectively.

This concludes the description of the processing of Step S503.

Next, the analysis module 211 determines whether migration of the business system using the pool 140 corresponding to the target entry is required (Step S504).

Specifically, the analysis module 211 determines whether any one of the first resource evaluation value and the second resource evaluation value is larger than the migration threshold value. The migration threshold value is a value obtained from the three-tier threshold value table 1400. In a case where any one of the first resource evaluation value and the second resource evaluation value is larger than the migration threshold value, the analysis module 211 determines that migration of the business system using the pool 140 corresponding to the target entry is required.

In a case where it is determined that migration of the business system using the pool 140 corresponding to the target entry is required, the analysis module 211 updates the migration requirement determination information 232 (Step S505). After that, the analysis module 211 advances to Step S507.

Specifically, the analysis module 211 refers to the three-tier migration requirement determination table 1500 to retrieve an entry for which the storage ID 1501 and the pool ID 1502 match the storage ID 301 and the pool ID 302 of the target entry, respectively. The analysis module 211 sets "required" as the determination result 1503 of the retrieved entry.

In a case where there is no entry for which the storage ID 1501 and the pool ID 1502 match the storage ID 301 and the pool ID 302 of the target entry, respectively, the analysis module 211 adds an entry to the three-tier migration requirement determination table 1500, and sets the storage ID 301 and the pool ID 302 of the target entry as the storage ID 1501 and the pool ID 1502 of the added entry, respectively. Further, the analysis module 211 sets "required" as the determination result 1503 of the added entry.

After the analysis module 211 has updated the migration requirement determination information 232, the analysis module 211 deletes the entries stored in the work area.

In a case where it is determined that migration of the business system using the pool 140 corresponding to the target entry is not required, the analysis module 211 updates the migration requirement determination information 232 (Step S506). After that, the analysis module 211 advances to Step S507.

Specifically, the analysis module 211 refers to the three-tier migration requirement determination table 1500 to retrieve an entry for which the storage ID 1501 and the pool ID 1502 match the storage ID 301 and the pool ID 302 of the target entry, respectively. The analysis module 211 sets "not required" as the determination result 1503 of the retrieved entry.

In a case where there is no entry for which the storage ID 1501 and the pool ID 1502 match the storage ID 301 and the pool ID 302 of the target entry, respectively, the analysis module 211 adds an entry to the three-tier migration requirement determination table 1500, and sets the storage ID 301 and the pool ID 302 of the target entry as the storage ID 1501 and the pool ID 1502 of the added entry, respectively. Further, the analysis module 211 sets "not required" as the determination result 1503 of the added entry.

After the analysis module 211 has updated the migration requirement determination information 232, the analysis module 211 deletes the entries stored in the work area.

In Step S507, the analysis module 211 determines whether the processing is complete for all the pools 140 of the three-tier infrastructure 110 (Step S507).

In a case where the processing is not complete for all the pools 140 of the three-tier infrastructure 110, the analysis module 211 returns to Step S502 to execute similar processing.

In a case where the processing is complete for all the pools 140 of the three-tier infrastructure 110, the analysis module 211 starts loop processing for the HCl 111 (Step S508).

Specifically, the analysis module 211 refers to the HCl configuration information 222, and identifies the HCl 111 (cluster). The analysis module 211 selects one target cluster from among the identified clusters.

Next, the analysis module 211 starts loop processing for the servers 120 belonging to the target cluster (Step S509).

Specifically, the analysis module 211 refers to the HCl server information 223 to retrieve an entry for which identification information of the target cluster is set as the cluster ID 602. The analysis module 211 selects one retrieved entry. The server 120 corresponding to the selected entry is the target server 120.

Next, the analysis module 211 calculates a resource evaluation value of the target server 120 (Step S510). Specifically, the following processing is executed.

(Step S510-1) The analysis module 211 refers to the HCl configuration information 222 to retrieve an entry for which identification information of the target cluster is stored in the cluster ID 501. The analysis module 211 stores the retrieved entry into the work area.

(Step S510-2) The analysis module 211 refers to the HCl pool monitoring information 228 to retrieve the latest entry storing the identification information of the target cluster in the cluster ID 1102. The analysis module 211 stores the retrieved entry into the work area. Further, the analysis module 211 refers to the HCl server monitoring information 227 to retrieve the latest entry storing the identification information of the target server 120 in the server ID 1002. In a case where there are two or more servers 120 belonging to the target cluster, a plurality of entries are stored in the work area.

(Step S510-3) The analysis module 211 refers to the HCl threshold value table 1410 to retrieve an entry storing the identification information of the target cluster in the cluster ID 1411. The analysis module 211 stores the retrieved entry into the work area.

(Step S510-4) The analysis module 211 calculates a first resource evaluation value and a second resource evaluation value based on Expression (11) and Expression (12), respectively.

$$\text{first resource evaluation value} = \frac{\text{usage amount}}{\text{capacity} \times \text{capacity threshold value}} \quad (11)$$

$$\text{second resource evaluation value} = CPU \text{ usage rate} \quad (12)$$

The usage amount of Expression (11) is a value of the usage amount 1103 of the entry obtained from the HCl pool monitoring information 228. The CPU usage rate of Expression (12) is a value of the CPU usage rate 1003 of the entry obtained from the HCl server monitoring information 227. The capacity and the capacity threshold value of Expression (11) are values of the capacity 502 and the capacity threshold value 503 of the entry obtained from the HCl configuration information 222, respectively.

This concludes the description of the processing of Step S510.

Next, the analysis module 211 determines whether migration of the business system using the target server 120 is required (Step S511).

Specifically, the analysis module 211 determines whether any one of the first resource evaluation value and the second resource evaluation value is larger than the migration threshold value. The migration threshold value is a value obtained from the HCl threshold value table 1410. In a case where any one of the first resource evaluation value and the second resource evaluation value is larger than the migration threshold value, the analysis module 211 determines that migration of the business system using the target server 120 is required.

In a case where it is determined that migration of the business system using the target server 120 is required, the analysis module 211 updates the migration requirement determination information 232 (Step S512). After that, the analysis module 211 advances to Step S514.

Specifically, the analysis module 211 refers to the HCl migration requirement determination table 1510 to retrieve an entry storing the identification information of the target server 120 in the server ID 1511. The analysis module 211 sets "required" as the determination result 1512 of the retrieved entry.

In a case where there is no entry storing the identification information of the target server 120 in the server ID 1511, the analysis module 211 adds an entry to the HCl migration requirement determination table 1510, and sets the identification information of the target server 120 as the server ID 1511 of the added entry. Further, the analysis module 211 sets "required" as the determination result 1512 of the added entry.

After the analysis module 211 has updated the migration requirement determination information 232, the analysis module 211 deletes the entries stored in the work area.

In a case where it is determined that migration of the business system using the target server 120 is not required, the analysis module 211 updates the migration requirement determination information 232 (Step S513). After that, the analysis module 211 advances to Step S514.

Specifically, the analysis module 211 refers to the HCl migration requirement determination table 1510 to retrieve an entry storing the identification information of the target server 120 in the server ID 1511. The analysis module 211 sets "not required" as the determination result 1512 of the retrieved entry.

In a case where there is no entry storing the identification information of the target server 120 in the server ID 1511, the analysis module 211 adds an entry to the HCl migration requirement determination table 1510, and sets the identification information of the target server 120 as the server ID 1511 of the added entry. Further, the analysis module 211 sets "not required" as the determination result 1512 of the added entry.

After the analysis module 211 has updated the migration requirement determination information 232, the analysis module 211 deletes the entries stored in the work area.

In Step S514, the analysis module 211 determines whether the processing is complete for all the servers 120 belonging to the target cluster (Step S514).

In a case where the processing is not complete for all the servers 120 belonging to the target cluster, the analysis module 211 returns to Step S509 to execute similar processing.

In a case where the processing is complete for all the servers 120 belonging to the target cluster, the analysis module 211 determines whether the processing is complete for all the HCIs 111 (Step S515).

In a case where the processing is not complete for all the HCIs 111, the analysis module 211 returns to Step S508 to execute similar processing.

In a case where the processing is complete for all the HCIs 111, the analysis module 211 finishes the migration candidate selection processing.

Through the processing of from Step S502 to Step S507, it is possible to identify the pool 140 requiring migration of the three-tier infrastructure 110. Further, through the processing of from Step S508 to Step S515, it is possible to identify the server 120 requiring migration of the HCI 111.

Figure 22:
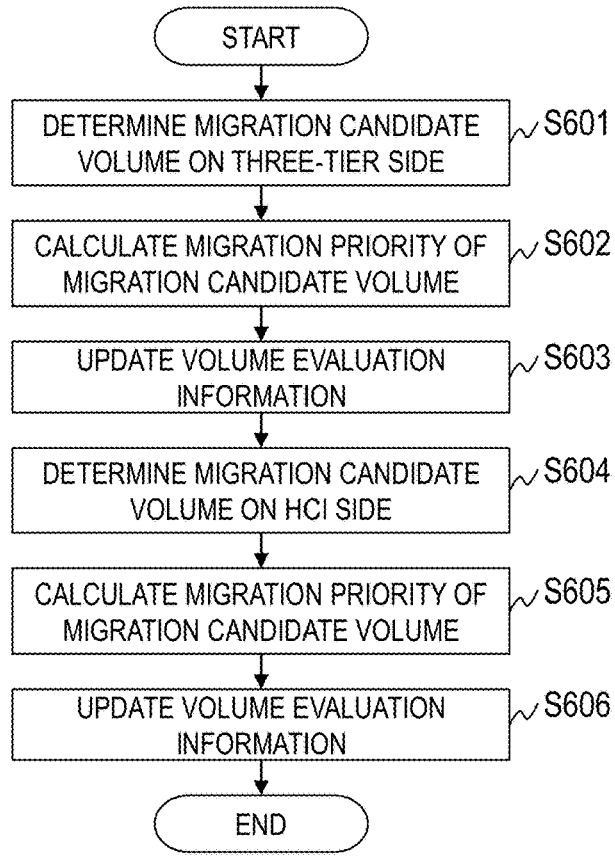
FIG. 22 is a flow chart for illustrating an example of priority determination processing to be executed by the management server in the first embodiment.
Figure 23A:
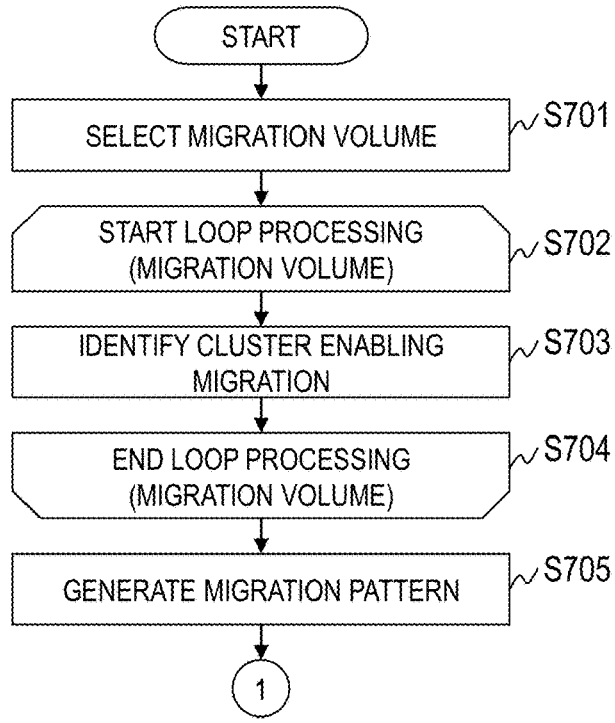
FIG. 23A, FIG. 23B, FIG. 23C, and FIG. 23D are flow charts for illustrating an example of migration pattern evaluation processing to be executed by the management server in the first embodiment.
Figure 23B:
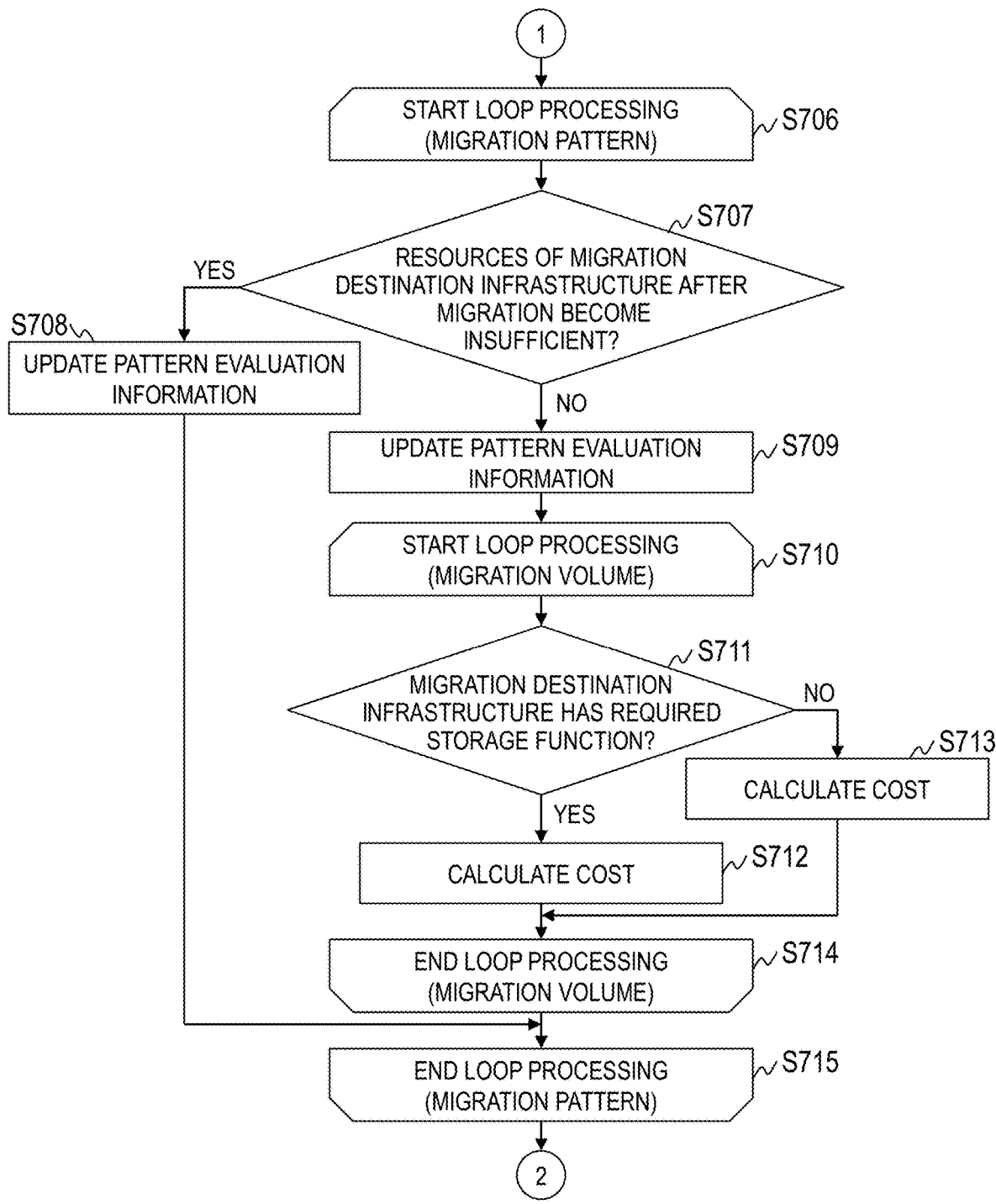
Figure 23C:
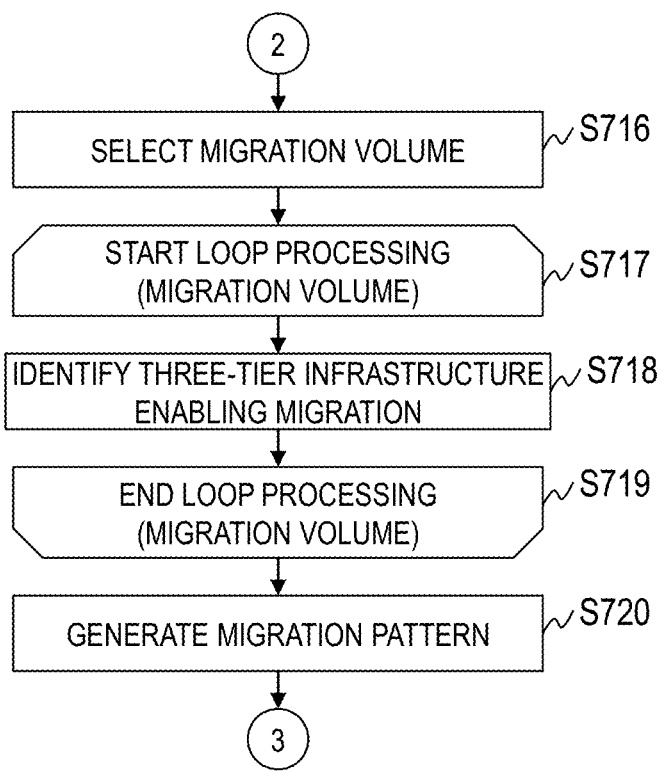
Figure 23D:
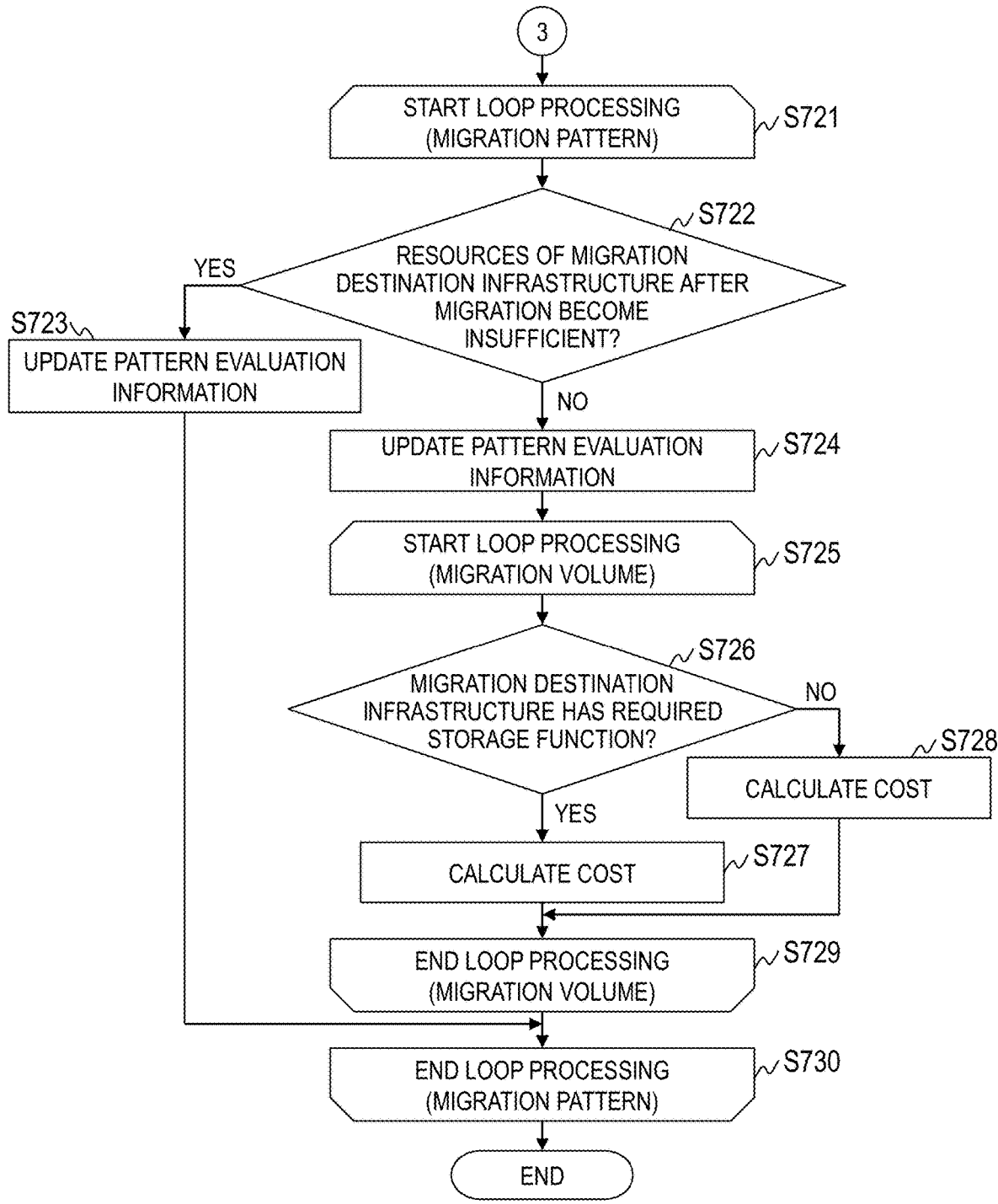

FIG. 22 is a flow chart for illustrating an example of the priority determination processing to be executed by the management server 100 in the first embodiment.

The analysis module 211 determines a migration candidate volume based on the result of determining whether migration of the three-tier infrastructure 110 is required (Step S601). Specifically, the following processing is executed.

(Step S601-1) The analysis module 211 refers to the three-tier migration requirement determination table 1500 to retrieve entries for which "required" is set as the determination result 1503. The analysis module 211 stores the retrieved entries into the work area. The analysis module 211 selects one target entry (target pool 140) from among the retrieved entries.

(Step S601-2) The analysis module 211 refers to the three-tier volume monitoring information 226 to retrieve the latest entries for which the storage ID 903 and the pool ID 904 match the storage ID 1501 and the pool ID 1502 of the target entry, respectively. The analysis module 211 stores the retrieved entries into the work area. The analysis module 211 selects one target entry (target volume 160) from among the retrieved entries.

(Step S601-3) The analysis module 211 refers to the three-tier volume evaluation table 1300 to retrieve an entry for which the volume ID 1301 stores the identification information of the target volume 160. The analysis module 211 adds a flag to the retrieved entry.

(Step S601-4) The analysis module 211 determines whether the processing is complete for all the volumes 160. In a case where the processing is not complete for all the volumes 160, the analysis module 211 selects a new target volume 160, and returns to Step S601-3.

(Step S601-5) In a case where the processing is complete for all the volumes 160, the analysis module 211 determines whether the processing is complete for all the pools 140. In a case where the processing is not complete for all the pools 140, the analysis module 211 selects a new target pool 140, and returns to Step S601-2.

(Step S601-6) In a case where the processing is complete for all the pools 140, the analysis module 211 deletes an entry without a flag from the three-tier volume evaluation table 1300. The volume 160 registered in the three-tier volume evaluation table 1300 serves as a migration candidate volume.

This concludes the description of the processing of Step S601.

Next, the analysis module 211 calculates a migration priority of the migration candidate volume (Step S602). Specifically, the following processing is executed.

(Step S602-1) The analysis module 211 selects one target entry from the three-tier volume evaluation table 1300.

(Step S602-2) The analysis module 211 substitutes the first infrastructure evaluation value 1302 and the second infrastructure evaluation value 1303 of the target entry into Expression (13) to calculate the migration priority.

$$|\text{first evaluation value}-1.0|+|\text{second evaluation value}-1.0| \qquad (13)$$

(Step S602-3) The analysis module 211 determines whether the processing is complete for all the entries of the three-tier volume evaluation table 1300. In a case where the processing is not complete for all the entries of the three-tier volume evaluation table 1300, the analysis module 211 returns to Step S602-1. In a case where the processing is complete for all the entries of the three-tier volume evaluation table 1300, the analysis module 211 finishes the processing of Step S602.

This concludes the description of the processing of Step S602.

Next, the analysis module 211 updates the volume evaluation information 230 based on the migration priority (Step S603).

Specifically, the analysis module 211 sorts entries of the three-tier volume evaluation table 1300 in ascending order of migration priority.

Next, the analysis module 211 determines a migration candidate volume based on the result of determining whether migration of the HCI 111 is required (Step S604). Specifically, the following processing is executed.

(Step S604-1) The analysis module 211 refers to the HCI migration requirement determination table 1510 to retrieve entries for which "required" is set as the determination result 1512. The analysis module 211 stores the retrieved entries into the work area. The analysis module 211 selects one target entry (target server 120) from among the retrieved entries.

(Step S604-2) The analysis module 211 refers to the HCI volume monitoring information 229 to retrieve the latest entries storing the identification information of the target server 120 in the server ID 1203. The analysis module 211 stores the retrieved entries into the work area. The analysis module 211 selects one target entry (target volume 160) from among the retrieved entries.

(Step S604-3) The analysis module 211 refers to the HCI volume evaluation table 1310 to retrieve an entry for which the volume ID 1311 stores the identification information of the target volume 160. The analysis module 211 adds a flag to the retrieved entry.

(Step S604-4) The analysis module 211 determines whether the processing is complete for all the volumes 160. In a case where the processing is not complete for all the volumes 160, the analysis module 211 selects a new target volume 160, and returns to Step S604-3.

(Step S604-5) In a case where the processing is complete for all the volumes 160, the analysis module 211 determines whether the processing is complete for all the servers 120. In a case where the processing is not complete for all the servers 120, the analysis module 211 selects a new target server 120, and returns to Step S604-2.

(Step S604-6) In a case where the processing is complete for all the servers 120, the analysis module 211 deletes an entry without a flag from the HCI volume evaluation table 1310. The volume 160 registered in the HCI volume evaluation table 1310 serves as a migration candidate volume.

This concludes the description of the processing of Step S604.

Next, the analysis module 211 calculates a migration priority of the migration candidate volume (Step S605). Specifically, the following processing is executed.

(Step S605-1) The analysis module 211 selects one target entry from the HCI volume evaluation table 1310.

(Step S605-2) The analysis module 211 substitutes the first infrastructure evaluation value 1312 and the second infrastructure evaluation value 1313 of the target entry into Expression (14) to calculate the migration priority.

$$|\text{first evaluation value}-1.0|+|\text{second evaluation value}-1.0| \qquad (14)$$

(Step S605-3) The analysis module 211 determines whether the processing is complete for all the entries of the HCI volume evaluation table 1310. In a case where the processing is not complete for all the entries of the HCI volume evaluation table 1310, the analysis module 211 returns to Step S605-1. In a case where the processing is complete for all the entries of the HCI volume evaluation table 1310, the analysis module 211 finishes the processing of Step S605.

This concludes the description of the processing of Step S605.

Next, the analysis module 211 updates the volume evaluation information 230 based on the migration priority (Step S606). After that, the analysis module 211 finishes the priority determination processing.

Specifically, the analysis module 211 sorts entries of the HCI volume evaluation table 1310 in ascending order of migration priority.

FIG. 23A, FIG. 23B, FIG. 23C, and FIG. 23D are flow charts for illustrating an example of the migration pattern evaluation processing to be executed by the management server 100 in the first embodiment.

The analysis module 211 selects the migration volume 160 in the three-tier infrastructure 110 (Step S701).

Specifically, the analysis module 211 selects n entries in order from the top of the three-tier volume evaluation table 1300. The number n can be set to any value. The volume 160 corresponding to the selected entry serves as the migration volume 160.

In a case where all the volumes 160 are migrated, a load of the infrastructure being a migration destination increases, and in addition, the number of combinations of infrastructures being a migration source and a migration destination becomes enormous, resulting in increase in calculation amount. In view of this, the number of volumes 160 to be migrated is set in advance in the first embodiment.

Further, the migration priority is a value calculated based on the first infrastructure evaluation value and the second infrastructure evaluation value, which is also a value evaluating whether the infrastructure used by the business system is appropriate. Thus, the processing of selecting a business system based on the migration priority corresponds to preferential selection of a volume for which migration to a different infrastructure is recommended.

Next, the analysis module 211 starts loop processing for the migration volumes 160 (Step S702).

Specifically, the analysis module 211 selects one target volume 160 from among the migration volumes 160.

Next, the analysis module 211 identifies the HCI 111 enabling migration (Step S703). Specifically, the following processing is executed.

(Step S703-1) The analysis module 211 calculates the usage amount of resources of the business system including the migration volume 160 as its component based on the three-tier server monitoring information 224 and the three-tier pool monitoring information 225. The method of calculating the usage amount of resources is a publicly known technology, and thus a detailed description thereof is omitted.

(Step S703-2) The analysis module 211 calculates a free capacity of resources of the HCI 111 based on the HCI configuration information 222, the HCI server information 223, the HCI server monitoring information 227, and the HCI pool monitoring information 228. The method of calculating the free capacity of resources is a publicly known technology, and thus a detailed description thereof is omitted.

(Step S703-3) The analysis module 211 identifies the HCI 111 for which the free capacity of resources is equal to or larger than the usage amount of resources of the business system including the migration volume 160. Further, the analysis module 211 selects, based on the HCI server monitoring information 227, the server 120 having the smallest CPU usage rate 1003 from among the servers 120 belonging to the identified HCI 111.

The analysis module 211 may add, to the determination condition, not only the capacity of resources but also presence/absence of the storage function used by the business system. In this case, the server 120 of the HCI 111 with the storage function for which the free capacity of resources is equal to or larger than the usage amount of resources is selected.

(Step S703-4) The analysis module 211 stores, into the work area, data associating the migration volume 160 with a combination of the identification information of the HCI 111 and the identification information of the server 120. In a case where there are a plurality of HCIs 111 identified in Step S703-3, the same number of pieces of data as that of the HCIs 111 are stored into the work area.

This concludes the description of the processing of Step S703.

Next, the analysis module 211 determines whether the processing is complete for all the migration volumes 160 (Step S704).

In a case where the processing is not complete for all the migration volumes 160, the analysis module 211 returns to Step S702 to execute similar processing.

In a case where the processing is complete for all the migration volumes 160, the analysis module 211 generates a migration pattern (Step S705).

Specifically, the analysis module 211 generates, as the migration pattern, a combination of the migration volume 160 and the HCI 111 being a migration destination. The analysis module 211 adds, to the HCI pattern evaluation table 1610, the same number of entries as that of the generated patterns, and sets the identification information as the pattern ID 1611 of the added entry. Further, the analysis module 211 sets information on the generated migration pattern as the pattern 1612 of the added entry.

Next, the analysis module 211 starts loop processing for migration patterns registered in the HCI pattern evaluation table 1610 (Step S706).

Specifically, the analysis module 211 selects one entry (target pattern) from the HCl pattern evaluation table 1610.

Next, the analysis module 211 determines whether the resources of the infrastructure being a migration destination become insufficient in a case where each migration volume 160 is migrated to an infrastructure (HCl 111) being a migration destination (Step S707).

A publicly known technology may be used as the method of determining insufficiency of resources of the infrastructure being a migration source and the infrastructure being a migration destination. For example, the analysis module 211 determines whether Expression (15) and Expression (16) are satisfied for each migration volume 160.

$$\text{usage amount of migration destination+usage amount of migration source>capacity of migration destination×capacity threshold value} \quad (15)$$

$$\text{CPU usage rate of migration destination+MP usage rate of migration source>CPU threshold value} \quad (16)$$

The usage rate of the migration destination of Expression (15) is the value of the usage amount 1103, the usage amount of the migration source of Expression (15) is the value of the usage amount 905, the capacity of the migration destination of Expression (15) is the value of the capacity 502, and the capacity threshold value of Expression (15) is the value of the capacity threshold value 503. The CPU usage rate of the migration destination of Expression (16) is the value of the CPU usage rate 1003, the MP usage rate of the migration source of Expression (16) is the value of the MP usage rate 907, and the CPU threshold value of Expression (16) is the value of the CPU threshold value 603. In a case where there are migration volumes 160 having the same HCl 111 as the migration destination, the usage rate of the migration source on the left side of Expression (15) is the total value of usage amounts 905 of the respective migration volumes 160, and the MP usage rate of the migration source on the left side of Expression (16) is the total value of MP usage rates 907 of the respective migration volumes 160.

In a case where all the migration volumes 160 satisfy Expression (15) and Expression (16), the analysis module 211 determines that the resources of the infrastructure being a migration destination do not become insufficient.

In a case where it is determined that the resources of the infrastructure being a migration destination become insufficient, the analysis module 211 updates the pattern evaluation information 233 (Step S708), and advances to Step S715.

Specifically, the analysis module 211 sets "not feasible" as the feasibility 1613 of the entry of the HCl pattern evaluation table 1610.

In a case where it is determined that the resources of the infrastructure being a migration destination do not become insufficient, the analysis module 211 updates the pattern evaluation information 233 (Step S709).

Specifically, the analysis module 211 sets "feasible" as the feasibility 1613 of the entry of the HCl pattern evaluation table 1610.

Next, the analysis module 211 starts loop processing for the migration volumes 160 of the target pattern (Step S710).

Specifically, the analysis module 211 selects the target volume 160 from among the migration volumes 160 of the target pattern.

Next, the analysis module 211 determines whether the infrastructure being a migration destination has the storage function provided to the target volume 160 (Step S711).

Specifically, the analysis module 211 compares the function 309 of the pool used by the target volume 160 with the function 506 of the infrastructure being a migration destination.

In a case where the infrastructure being a migration destination has the storage function provided to the target volume 160, the analysis module 211 calculates the cost (Step S712), and advances to Step S714.

Specifically, the analysis module 211 calculates the cost based on Expression (17). The analysis module 211 adds the calculated cost to the value of the cost 1504 of the entry of the HCl pattern evaluation table 1610.

$$\begin{aligned}&(\text{usage amount of migration source×volume cost×}\\&\quad \text{reduction rate×number of generations−usage}\\&\quad \text{amount of migration destination×volume cost×}\\&\quad \text{reduction rate×number of generations)+(MP}\\&\quad \text{usage rate×MP cost−CPU usage rate×CPU cost)} \quad (17)\end{aligned}$$

The usage amount of the migration source of Expression (17) is the value of the usage amount 905, the volume cost of Expression (17) is the value of the volume cost 307, the reduction rate of Expression (17) is the value of the reduction rate 906, and the number of generations of Expression (17) is the value of the copy 311. The usage amount of the migration destination of Expression (17) is the value of the usage amount 1103, the volume cost of Expression (17) is the value of the volume cost 505, the reduction rate of Expression (17) is the value of the reduction rate 1206, and the number of generations of Expression (17) is the value of the copy 511. The MP usage rate of Expression (17) is the value of the MP usage rate 907, and the MP cost of Expression (17) is the value of the MP cost 308. The CPU usage rate of Expression (17) is the value of the CPU usage rate 1003, and the CPU cost of Expression (17) is the value of the CPU cost 404.

In a case where the infrastructure being a migration destination does not have the storage function provided to the target volume 160, the analysis module 211 calculates the cost (Step S713), and advances to Step S714.

Specifically, the analysis module 211 calculates the cost based on Expression (18). The analysis module 211 adds the calculated cost to the value of the cost 1614 of the entry of the HCl pattern evaluation table 1610.

$$\begin{aligned}&(\text{usage amount of migration source×volume cost−}\\&\quad \text{usage amount of migration destination×volume}\\&\quad \text{cost)+(MP usage rate×MP cost−CPU usage}\\&\quad \text{rate×CPU cost)} \quad (18)\end{aligned}$$

The usage amount of the migration source of Expression (18) is the value of the usage amount 905, and the volume cost of Expression (18) is the value of the volume cost 307. The usage amount of the migration destination of Expression (18) is the value of the usage amount 1103, and the volume cost of Expression (18) is the value of the volume cost 505. The MP usage rate of Expression (18) is the value of the MP usage rate 907, and the MP cost of Expression (18) is the value of the MP cost 308. The CPU usage rate of Expression (18) is the value of the CPU usage rate 1003, and the CPU cost of Expression (18) is the value of the CPU cost 404.

In Step S714, the analysis module 211 determines whether the processing is complete for all the migration volumes of the target pattern (Step S714).

In a case where the processing is not complete for all the migration volumes of the target pattern, the analysis module 211 returns to Step S710 to execute similar processing.

In a case where the processing is complete for all the migration volumes of the target pattern, the analysis module 211 determines whether the processing is complete for all the migration patterns registered in the HCI pattern evaluation table 1610 (Step S715).

In a case where the processing is not complete for all the migration patterns registered in the HCI pattern evaluation table 1610, the analysis module 211 returns to Step S706 to execute similar processing.

In a case where the processing is complete for all the migration patterns registered in the HCI pattern evaluation table 1610, the analysis module 211 selects the migration volume 160 in the HCI 111 (Step S716).

Specifically, the analysis module 211 selects n' entries in order from the top of the HCI volume evaluation table 1310. The number n' can be set to any value. The volume 160 corresponding to the selected entry serves as the migration volume 160.

Next, the analysis module 211 starts loop processing for the migration volumes 160 (Step S717).

Specifically, the analysis module 211 selects one target volume 160 from among the migration volumes 160.

Next, the analysis module 211 identifies the three-tier infrastructure 110 enabling migration (Step S718). Specifically, the following processing is executed.

(Step S718-1) The analysis module 211 calculates the usage amount of resources of the business system including the migration volume 160 as its component based on the HCI server monitoring information 227, the HCI pool monitoring information 228, and the HCI volume monitoring information 229. The method of calculating the usage amount of resources is a publicly known technology, and thus a detailed description thereof is omitted.

(Step S718-2) The analysis module 211 calculates a free capacity of resources of the three-tier infrastructure 110 based on the three-tier configuration information 220, the three-tier server configuration information 221, the three-tier server monitoring information 224, and the three-tier pool monitoring information 225. The method of calculating the free capacity of resources is a publicly known technology, and thus a detailed description thereof is omitted.

(Step S718-3) The analysis module 211 identifies the three-tier infrastructure 110 for which the free capacity of resources is equal to or larger than the usage amount of resources of the business system including the migration volume 160.

The analysis module 211 may add, to the determination condition, not only the capacity of resources but also presence/absence of the storage function used by the business system. In this case, the three-tier infrastructure 110 with the storage function for which the free capacity of resources is equal to or larger than the usage amount of resources is identified.

(Step S718-4) The analysis module 211 stores, into the work area, data associating the migration volume 160 with the identification information of the three-tier infrastructure 110. In a case where there are a plurality of three-tier infrastructures 110 identified in Step S718-3, the same number of pieces of data as that of the three-tier infrastructures 110 are stored into the work area.

This concludes the description of the processing of Step S718.

Next, the analysis module 211 determines whether the processing is complete for all the migration volumes 160 (Step S719).

In a case where the processing is not complete for all the migration volumes 160, the analysis module 211 returns to Step S717 to execute similar processing.

In a case where the processing is complete for all the migration volumes 160, the analysis module 211 generates a migration pattern (Step S720).

Specifically, the analysis module 211 generates, as the migration pattern, a combination of the migration volume 160 and the three-tier infrastructure 110 being a migration destination. The analysis module 211 adds, to the three-tier pattern evaluation table 1600, the same number of entries as that of the generated patterns, and sets the identification information as the pattern ID 1601 of the added entry. Further, the analysis module 211 sets information on the generated migration pattern as the pattern 1602 of the added entry.

Next, the analysis module 211 starts loop processing for migration patterns registered in the three-tier pattern evaluation table 1600 (Step S721).

Specifically, the analysis module 211 selects one entry (target pattern) from the three-tier pattern evaluation table 1600.

Next, the analysis module 211 determines whether the resources of the infrastructure being a migration destination become insufficient in a case where each migration volume 160 is migrated to an infrastructure (three-tier infrastructure 110) being a migration destination (Step S722). The processing of Step S722 is similar to that of Step S707, and thus a detailed description thereof is omitted here.

In a case where it is determined that the resources of the infrastructure being a migration destination become insufficient, the analysis module 211 updates the pattern evaluation information 233 (Step S723), and advances to Step S730.

Specifically, the analysis module 211 sets "not feasible" as the feasibility 1603 of the entry of the three-tier pattern evaluation table 1600.

In a case where it is determined that the resources of the infrastructure being a migration destination do not become insufficient, the analysis module 211 updates the pattern evaluation information 233 (Step S724).

Specifically, the analysis module 211 sets "feasible" as the feasibility 1603 of the entry of the three-tier pattern evaluation table 1600.

Next, the analysis module 211 starts loop processing for the migration volumes 160 of the target pattern (Step S725).

Specifically, the analysis module 211 selects the target volume 160 from among the migration volumes 160 of the target pattern.

Next, the analysis module 211 determines whether the infrastructure being a migration destination has the storage function provided to the target volume 160 (Step S726).

Specifically, the analysis module 211 compares the function 506 of the cluster used by the target volume 160 with the function 309 of the infrastructure being a migration destination.

In a case where the infrastructure being a migration destination has the storage function provided to the target volume 160, the analysis module 211 calculates the cost (Step S727), and advances to Step S729. The processing of Step S727 is similar to that of Step S712, and thus a detailed description thereof is omitted here.

In a case where the infrastructure being a migration destination does not have the storage function provided to the target volume 160, the analysis module 211 calculates the cost (Step S728), and advances to Step S729. The processing of Step S728 is similar to that of Step S713, and thus a detailed description thereof is omitted here.

In Step S729, the analysis module 211 determines whether the processing is complete for all the migration volumes of the target pattern (Step S729).

In a case where the processing is not complete for all the migration volumes of the target pattern, the analysis module 211 returns to Step S725 to execute similar processing.

In a case where the processing is complete for all the migration volumes of the target pattern, the analysis module 211 determines whether the processing is complete for all the migration patterns registered in the three-tier pattern evaluation table 1600 (Step S730).

In a case where the processing is not complete for all the migration patterns registered in the three-tier pattern evaluation table 1600, the analysis module 211 returns to Step S721 to execute similar processing.

In a case where the processing is complete for all the migration patterns registered in the three-tier pattern evaluation table 1600, the analysis module 211 finishes the migration pattern evaluation processing.

Figure 24:
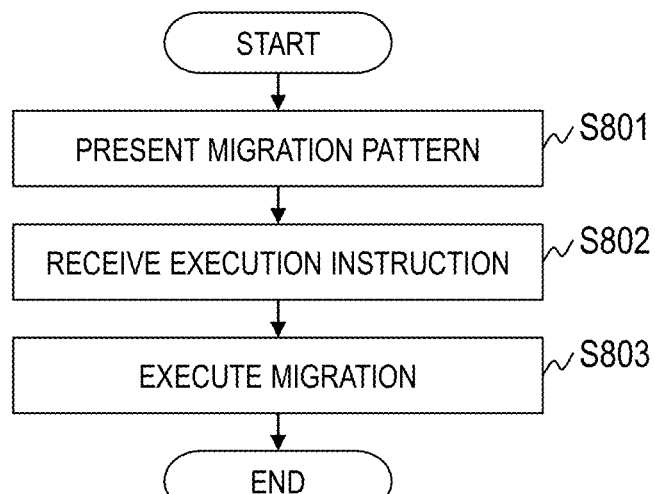
FIG. 24 is a flow chart for illustrating an example of processing of migrating business system to be executed by the management server in the first embodiment.

FIG. 24 is a flow chart for illustrating an example of the processing of migrating the business system to be executed by the management server 100 in the first embodiment.

The analysis module 211 presents migration patterns to the user (Step S801).

Specifically, the analysis module 211 selects m entries in ascending order of the value of the cost 1604 from the three-tier pattern evaluation table 1600, and presents, to a terminal or the like used by the user, migration patterns set in the patterns 1602 of those entries. Further, the analysis module 211 selects m' entries in ascending order of the value of the cost 1614 from the HCI pattern evaluation table 1610, and presents, to the terminal or the like used by the user, migration patterns set in the patterns 1602 of those entries.

Through preferential display of a migration pattern that implements migration to an infrastructure with a sufficient free capacity of resources and low operation cost, it is possible to achieve appropriate arrangement of the business system and reduction of the operation cost.

Entries for which "not feasible" is set as the feasibilities 1603 and 1613 are excluded from the selection target. The numbers m and m' can be set to any values.

The analysis module 211 receives an instruction to execute migration from the user (Step S802). The instruction includes identification information of a migration pattern to be executed.

The analysis module 211 migrates the business system between infrastructures in accordance with the instructed migration pattern (Step S803). After that, the analysis module 211 finishes the processing of migrating the business system. A publicly known technology may be used as the method of migration between infrastructures, and thus a detailed description thereof is omitted here.

The analysis module 211 may automatically select a migration pattern based on the costs 1604 and 1614, and migrate the business system between infrastructures in accordance with the selected migration pattern.

According to the first embodiment, the management server 100 can evaluate the infrastructure with architecture appropriate for a business system by considering a balance between the calculation resource and the storage resource of the business system. Further, the management server 100 can optimize arrangement of a business system in a system in which infrastructures with different architecture are arranged in a mixed manner by migrating the business system between the infrastructures based on the evaluation. Further, it is possible to manage the resources of an infrastructure efficiently and easily.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, Python and Java.

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A management system, which is configured to manage an infrastructure system, the infrastructure system being configured to provide a resource for operating a business system and including a plurality of infrastructures with different architecture, the management system comprising at least one computer including:
a processor;
a storage device coupled to the processor; and
a network interface coupled to the processor,
the plurality of infrastructures including:
a first infrastructure constructed by at least one server apparatus, at least one switch, and at least one storage system; and
a second infrastructure constructed by at least one server apparatus,
the management system further comprising:
a monitoring module configured to monitor a usage state of the resource of the business system operating on each of the plurality of infrastructures; and an analysis module configured to identify a business system being a migration target based on the usage state of the resource of each of a plurality of business systems, wherein the analysis module is configured to:

analyze a previous usage amount of the resource of the business system based on the usage state of the resource of the business system, determine which of the first infrastructure and the second infrastructure is to be used for the business system based on a result of analyzing the previous usage amount of the resource of the business system, and store a result of determining as a first determination result;

identify a target infrastructure, which is an infrastructure for which the resource is predicted to become insufficient, among the plurality of infrastructures, based on the usage state of the resource of the each of the plurality of business systems, and store the target infrastructure as a second determination result;

select at least one business system being the migration target from among a plurality of business systems operating on the target infrastructure based on the first determination result and the second determination result; and migrate the at least one selected business system.

2. The management system according to claim 1, wherein the analysis module is configured to:

calculate, based on the result of analyzing the previous usage amount of the resource of the business system, an infrastructure evaluation value of each of the first infrastructure and the second infrastructure for the business system, and store the infrastructure evaluation value as the first determination result; and select, based on the infrastructure evaluation value for each of the plurality of business systems operating on the target infrastructure, a business system for an infrastructure with architecture, which is different from architecture of the target infrastructure, as the business system being the migration target.

3. The management system according to claim 2, wherein the analysis module is configured to select, based on a magnitude of a priority calculated based on the infrastructure evaluation value, a predetermined number of business systems as the business system being the migration targets from among the plurality of business systems operating on the target infrastructure.

4. The management system according to claim 1, wherein the analysis module is configured to:

identify at least one candidate infrastructure being a migration destination from among a plurality of infrastructures with architecture different from architecture of the target infrastructure, based on a free capacity of each of the plurality of infrastructures with architecture different from the architecture of the target infrastructure and a usage amount of the resource of the target infrastructure;

generate a migration pattern being a combination of the business system being the migration target and a candidate infrastructure;

determine, for each migration pattern, whether the resource of the candidate infrastructure after migration of the business system being the migration target becomes insufficient, and store a result of the determination as a third determination result;

calculate a cost required for migration of the business system being the migration target; and migrate the business system registered in the migration pattern determined based on the third determination result and the cost.

5. The management system according to claim 4, wherein the analysis module is configured to:

identify a storage function required for the business system being the migration target, and select a candidate infrastructure that enables the identified storage function to be achieved from among a plurality of candidate infrastructures; and generate the migration pattern being a combination of the business system being the migration target and the selected candidate infrastructure.

6. The management system according to claim 1, wherein the analysis module is configured to:

calculate, based on the result of analyzing the previous usage amount of the resource of the each of the plurality of business systems, a threshold value for determining insufficiency of the resource of each of the plurality of infrastructures;

calculate a resource evaluation value of the each of the plurality of infrastructures based on a usage amount of the resource of the each of the plurality of infrastructures; and identify the target infrastructure from among the plurality of infrastructures based on results of comparing the resource evaluation value of each of the plurality of infrastructures with the threshold value.

7. A management method for infrastructure system, which is executed by a management system, an infrastructure system being configured to provide a resource for operating a business system and including a plurality of infrastructures with different architecture, the management system including at least one computer including: a processor; a storage device coupled to the processor; and a network interface coupled to the processor, the plurality of infrastructures including:

a first infrastructure constructed by at least one server apparatus, at least one switch, and at least one storage system; and a second infrastructure constructed by at least one server apparatus, the management method for infrastructure system including:

a first step of monitoring, by the at least one computer, a usage state of the resource of the business system operating on each of the plurality of infrastructures; and a second step of analyzing, by the at least one computer, a previous usage amount of the resource of the business system based on the usage state of the resource of the business system, determining which of the first infrastructure and the second infrastructure is to be used for the business system based on a result of analyzing the previous usage amount of the resource of the business system, and storing a result of determining as a first determination result;

a third step of identifying, by the at least one computer, a target infrastructure, which is an infrastructure for which the resource is predicted to become insufficient among the plurality of infrastructures, based on the usage state of the resource of each of a plurality of business systems, and storing the target infrastructure as a second determination result;

a fourth step of selecting, by the at least one computer, at least one business system being the migration target from among a plurality of business systems operating on the target infrastructure based on the first determination result and the second determination result; and a fifth step of migrating, by the at least one computer, the at least one selected business system.

8. The management method for infrastructure system according to claim 7, wherein the second step includes calculating, by the at least one computer, based on the result of analyzing the previous usage amount of the resource of the business system, an infrastructure evaluation value of each of the first infrastructure and the second infrastructure for the business system, and storing the infrastructure evaluation value as the first determination result, and wherein the fourth step includes selecting, by the at least one computer, based on the infrastructure evaluation value for each of the plurality of business systems operating on the target infrastructure, a business system for an infrastructure with architecture, which is different from architecture of the target infrastructure, as the business system being the migration target.

9. The management method for infrastructure system according to claim 8, wherein the fourth step includes selecting, by the at least one computer, based on a magnitude of a priority calculated based on the infrastructure evaluation value, a predetermined number of business systems as the business systems being the migration targets.

10. The management method for infrastructure system according to claim 7, wherein the fourth step includes:

a sixth step of identifying, by the at least one computer, at least one candidate infrastructure being a migration destination from among a plurality of infrastructures with architecture different from architecture of the target infrastructure, based on a free capacity of each of the plurality of infrastructures with architecture different from the architecture of the target infrastructure and a usage amount of the resource of the target infrastructure;

a seventh step of generating, by the at least one computer, a migration pattern being a combination of the business system being the migration target and a candidate infrastructure;

an eighth step of determining, by the at least one computer, for each migration pattern, whether the resource of the candidate infrastructure after migration of the business system being the migration target becomes insufficient, and storing a result of the determination as a third determination result; and a ninth step of calculating, by the at least one computer, for each migration pattern, a cost required for migration of the business system being the migration target, wherein the fifth step includes migrating, by the at least one computer, the business system registered in the migration pattern determined based on the third determination result and the cost.

11. The management method for infrastructure system according to claim 10, wherein the fourth step includes identifying, by the at least one computer, a storage function required for the business system being the migration target, and wherein the seventh step includes:

selecting, by the at least one computer, a candidate infrastructure that enables the identified storage function to be achieved from among a plurality of candidate infrastructures; and generating, by the at least one computer, the migration pattern being a combination of the business system being the migration target and the selected candidate infrastructure.

12. The management method for infrastructure system according to claim 7, wherein the second step includes calculating, by the at least one computer, based on the result of analyzing the previous usage amount of the resource of the each of the plurality of business systems, a threshold value for determining insufficiency of the resource of each of the plurality of infrastructures, and wherein the third step includes:

calculating, by the at least one computer, a resource evaluation value of the each of the plurality of infrastructures based on a usage amount of the resource of the each of the plurality of infrastructures; and identifying, by the at least one computer, the target infrastructure from among the plurality of infrastructures based on results of comparing the resource evaluation value of each of the plurality of infrastructures with the threshold value.

\* \* \* \* \*